(12) United States Patent
Larson et al.

(10) Patent No.: US 11,567,508 B2
(45) Date of Patent: Jan. 31, 2023

(54) AUTONOMOUS UNMANNED VEHICLES FOR RESPONDING TO SITUATIONS

(71) Applicant: Intel Corporation, Santa Clara, CA (US)

(72) Inventors: Andrew Larson, Hillsboro, OR (US); Subhas Balappanavar, Portland, OR (US); Daniel Pohl, Puchheim (DE); Koba Natroshvili, Waldbronn (DE); Cornelius Buerkle, Karlsruhe (DE); Ellann Cohen, Hillsboro, OR (US); Andreas Herden, Malsch (DE); Ralph V. Miele, Hillsboro, OR (US); David Pidwerbecki, Hillsboro, OR (US); Roman Schick, Furstenfeldbruck (DE); Henning Schroeder, Karlsruhe (DE); Mark E. Sprenger, Tigard, OR (US)

(73) Assignee: Intel Corporation, Santa Clara, CA (US)

( * ) Notice: Subject to any disclaimer, the term of this patent is extended or adjusted under 35 U.S.C. 154(b) by 302 days.

(21) Appl. No.: 16/649,584

(22) PCT Filed: Dec. 20, 2017

(86) PCT No.: PCT/US2017/067547
§ 371 (c)(1),
(2) Date: Mar. 20, 2020

(87) PCT Pub. No.: WO2019/125429
PCT Pub. Date: Jun. 27, 2019

(65) Prior Publication Data
US 2020/0278689 A1    Sep. 3, 2020

(51) Int. Cl.
*B64C 39/02*    (2006.01)
*G05D 1/00*    (2006.01)
(Continued)

(52) U.S. Cl.
CPC ......... *G05D 1/0242* (2013.01); *B64C 39/024* (2013.01); *B64D 47/08* (2013.01);
(Continued)

(58) Field of Classification Search
CPC .... G05D 1/0242; G05D 1/0094; G05D 1/104; G05D 1/00; B64C 39/024;
(Continued)

(56) References Cited

U.S. PATENT DOCUMENTS 9,056,676 B1 *    6/2015    Wang ..................... B60R 9/00
10,102,586 B1 *   10/2018    Marlow ................ B64C 39/024
(Continued)

FOREIGN PATENT DOCUMENTS

| CN | 104881518 A | 9/2015 |
| KR | 100835085 B1 | 6/2008 |
| WO | 2014/080388 A2 | 5/2014 |

OTHER PUBLICATIONS

International Patent Office—International Search Report and Written Opinion dated Nov. 13, 2018 from International Application No. PCT/US2017/067547, 15 pages.

*Primary Examiner* — Yonel Beaulieu
(74) *Attorney, Agent, or Firm* — Schwabe, Williamson & Wyatt, P.C.

(57) ABSTRACT

Autonomous unmanned vehicles (UVs) for responding to situations are described. Embodiments include UVs that launch upon detection of a situation, operate in the area of the situation, and collect and send information about the situation. The UVs may launch from a vehicle involved in the situation, a vehicle responding to the situation, or from a fixed station. In other embodiments, the UVs also provide communications relays to the situation and may facilitate access to the situation by responders. The UVs further may act as decoupled sensors for vehicles. In still other embodi- (Continued)

ments, the collected information may be used to recreate the situation as it happened.

24 Claims, 13 Drawing Sheets

(51) Int. Cl.
| | | |
|---|---|---|
| *B64D 47/08* | (2006.01) | |
| *G08G 5/00* | (2006.01) | |
| *G05D 1/02* | (2020.01) | |
| *H04N 5/76* | (2006.01) | |
| *H04N 13/243* | (2018.01) | |
| *H04N 5/225* | (2006.01) | |
| *H04N 5/247* | (2006.01) | |

(52) U.S. Cl.
CPC .......... *G08G 5/0013* (2013.01); *H04N 5/2253* (2013.01); *H04N 5/247* (2013.01); *H04N 5/76* (2013.01); *H04N 13/243* (2018.05); *B64C 2201/027* (2013.01); *B64C 2201/08* (2013.01); *B64C 2201/127* (2013.01); *B64C 2201/208* (2013.01)

(58) Field of Classification Search
CPC .......... B64C 2201/027; B64C 2201/08; B64C 2201/127; B64C 2201/208; B64C 2201/12; B64C 2201/141; B64C 2201/143; B64C 39/02; B64D 47/08; B64D 7/00; G08G 5/0013; G08G 5/00; H04N 5/2253; H04N 5/247; H04N 5/76; H04N 13/243

See application file for complete search history.

(56) References Cited

U.S. PATENT DOCUMENTS

| | | | |
|---|---|---|---|
| 10,380,694 B1* | 8/2019 | Grant | G06Q 50/265 |
| 10,866,597 B1* | 12/2020 | Reinhold | G05D 1/12 |
| 11,276,431 B1* | 3/2022 | Popov | G11B 5/86 |
| 2009/0294584 A1* | 12/2009 | Lovell | B64C 39/024 |
| | | | 901/30 |
| 2009/0314883 A1* | 12/2009 | Ariton | F41A 9/13 |
| | | | 244/63 |
| 2011/0049288 A1* | 3/2011 | Suzuki | B64C 37/02 |
| | | | 244/2 |
| 2014/0032034 A1* | 1/2014 | Raptopoulos | H04B 7/18506 |
| | | | 701/25 |
| 2016/0272317 A1 | 9/2016 | Cho et al. | |
| 2017/0144758 A1 | 5/2017 | Myslinkski | |
| 2017/0269594 A1* | 9/2017 | Sydnor | G05D 1/0011 |
| 2018/0321676 A1* | 11/2018 | Matuszeski | G05D 1/0016 |
| 2019/0051046 A1* | 2/2019 | Jin | H04N 5/23203 |
| 2019/0055018 A1* | 2/2019 | Bei | B64D 47/08 |
| 2020/0201358 A1* | 6/2020 | Corsica | B64C 39/024 |
| 2021/0192629 A1* | 6/2021 | Tofte | G01C 11/02 |
| 2021/0398434 A1* | 12/2021 | Madden | H04L 67/12 |

* cited by examiner

# US 11,567,508 B2

AUTONOMOUS UNMANNED VEHICLES FOR RESPONDING TO SITUATIONS

CROSS REFERENCE TO RELATED APPLICATIONS

The present application is a national phase entry under 35 U.S.C. § 371 of International Application No. PCT/US2017/067547, filed Dec. 20, 2017, entitled "AUTONOMOUS UNMANNED VEHICLES FOR RESPONDING TO SITUATIONS", which designated, among the various States, the United States of America. The Specifications of the PCT/US2017/067547 Application is hereby incorporated by reference.

TECHNICAL FIELD

Embodiments described herein generally relate to unmanned vehicles. In particular, unmanned vehicles for responding and assisting in situations, including emergency situations, are described.

BACKGROUND

Unmanned vehicles (UVs) can be equipped and configured to launch and carry out a predetermined mission autonomously. These mission capabilities may be enhanced or expanded when a UV is configured to carry a payload, such as one or more cameras, audio or visual signaling devices, communications gear, and/or sensor packages. Many UVs also include information gathering and processing capabilities, and so are able to analyze their surrounding environment and take actions in response. As the sophistication of UVs in these respects continues to develop and increase, UVs become an increasingly useful tool, which is further enhanced by many UVs' ability to go into environments that would be hostile or difficult for a person to enter, and either carry out actions or relay information.

DESCRIPTION OF EMBODIMENTS

Figure 1:
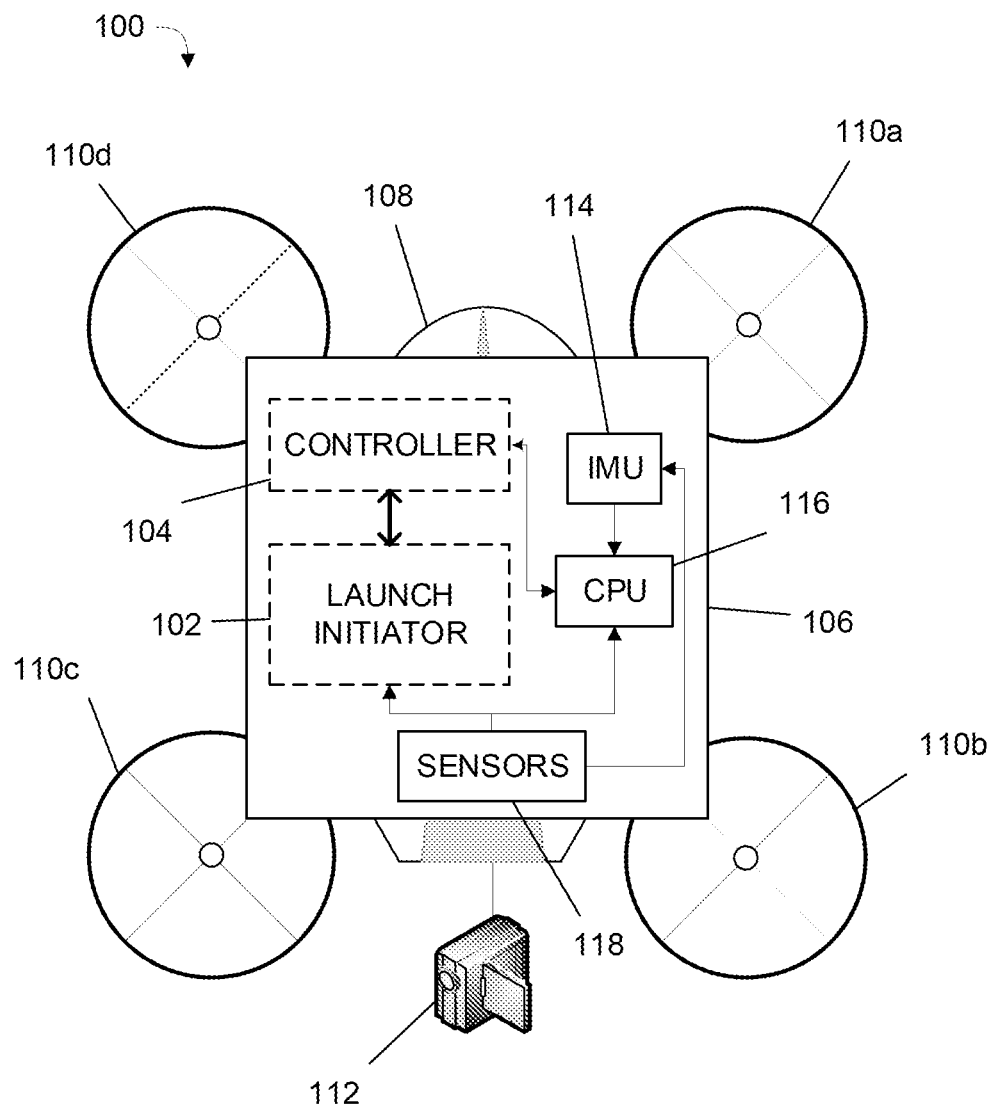
FIG. 1 is a diagram of the possible components of an unmanned vehicle (UV) for responding to a detected situation according to an example embodiment.

Embodiments of the present disclosure are directed toward unmanned vehicles ("UVs") that may be configured to provide assistance to various situations, including emergency situations. These situations may typically involve vehicles, including computer assisted or autonomous driving (CA/AD) vehicles (or simply, "vehicle"), both as beneficiaries of assistance from one or more UVs, and in some embodiments as the UV itself. Such vehicles may also include semi-autonomous driving vehicles. As used herein, the term semi-autonomous driving is synonymous with computer-assisted driving. The term does not mean exactly 50% of the driving functions are automated. The percentage of driving functions automated may be a fraction of a percent to almost 100%. UVs may be equipped for travel in a variety of different media, including air, land, water, and space, to allow an automated response to situations arising in a multitude of different environments.

UVs may be configured to perform a variety of tasks to assist in responding to a situation, including emergency situations. The particular tasks a UV may carry out may depend upon the nature of the situation. Some UVs may implement artificial intelligence (AI) to allow for analysis of a situation to determine the type of assistance needed, whether the UV can render the assistance in whole or in part, and whether a responder should be notified. Still further, UVs can act as advance intelligence gathering devices, providing enhanced situational awareness to responders, allowing responders to approach a situation with necessary precautions taken and equipment selected that may be of particular use to a given situation.

In the following description, various aspects of the illustrative implementations will be described using terms commonly employed by those skilled in the art to convey the substance of their work to others skilled in the art. However, it will be apparent to those skilled in the art that embodiments of the present disclosure may be practiced with only some of the described aspects. For purposes of explanation, specific numbers, materials, and configurations are set forth in order to provide a thorough understanding of the illustrative implementations. However, it will be apparent to one skilled in the art that embodiments of the present disclosure may be practiced without the specific details. In other instances, well-known features are omitted or simplified in order not to obscure the illustrative implementations.

In the following detailed description, reference is made to the accompanying drawings that form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A or B" means (A), (B), or (A and B). For the purposes of the present disclosure, the phrase "A, B, or C" means (A), (B), (C), (A and B), (A and C), (B and C), or (A, B, and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

FIG. 1 depicts an example unmanned vehicle (UV) 100 that may be utilized to implement any of the scenarios described below. UV 100 may be configured with any systems and equipment suitable to the UV's mission. In FIG. 1, UV 100 is depicted as a quadrotor or multicopter, although it should be understood that the implementation of UV 100 will depend upon its intended environment. UV 100 may be implemented as, for example, an autonomous submarine or boat for water environments, or as a space-faring vehicle. For ground and air applications, UV 100 may be implemented as a multirotor (as depicted), an airplane, a helicopter, a balloon, a glider, or any other similar flying vehicle. In other embodiments, UV 100 may be implemented as a ground-based vehicle, such as a car or motorcycle. The size, type, and configuration of UV 100 will vary depending upon the intended application.

UV 100 is comprised of a launch initiator 102, which may be communicatively coupled to a controller 104. These two components may, in some embodiments, be components of a control system 106 for UV 100. Control system 106 in turn may be mounted to a body or frame 108 of UV 100. One or more motors 110a, 110b, 110c, and 110d may be mounted to frame 108 and in electrical communication with control system 106. Motors 110a to 110d may be of a number and type suited to the type of UV 100. For example, where UV 100 is implemented as an airplane, there may be only one or two motors 110a, 110b, and such motors may be implemented as fuel-based (internal combustion) engines. Conversely, where UV 100 is implemented as a boat or submarine, motors 110a to 110d may be implemented as sealed electric motors, with only one or two motors being needed. Finally, one or more peripheral devices 112 may be attached to frame 108, and, depending on the type of peripheral device 112, may be in communication with and/or controlled by control system 106.

Depending upon the implementation of UV 100, control system 106 may include an inertial measurement unit (IMU) 114 for stabilizing and providing guidance control to UV 100. Control system 106 may further include components such as electronic speed controllers (ESCs) where motors 110a to 110d are implemented as electrical motors, or, where motors 110a to 110d are implemented using a fuel-powered engine, one or more control servos. In other implementations, control system 106 may also include actuators for control surfaces, which may include servos, or may control and guide UV 100 via ESCs by varying the thrust produced by motors 110a to 110d. Motors 110a to 110d may be implemented using any mechanism suitable to power UV 100 according to its intended task, and UV 100 may be equipped with any number of motors, including no motor in some implementations, according to the requirements of UV 100 and its intended mission.

Control system 106 may further include one or more processors 116, which may be general purpose central processing units (CPUs), specialized CPUs, embedded CPUs, application specific integrated circuits (ASICs), field-programmable gate arrays (FPGAs), discrete circuitry, or other suitable units or electronics capable of providing the necessary processing power to implement control functionality. Such processors 116 may further include supporting circuitry, which may include volatile storage (such as RAM) and/or non-volatile storage (such as flash storage or ROMs). Example embodiments of these components are detailed below with reference to FIG. 12.

Control system 106 may also include one or more sensors 118, which may feed into various components of control system 106. Sensors 118 may include various positional sensors, such as gyroscopes and accelerometers that may be used by IMU 114 to determine the attitude and motion of UV 100, and locational sensors such as barometers, altimeters, GPS receivers, and thermometers, which may feed to the CPU 116 and/or IMU 114, as necessary, to allow the location and movement of UV 100 to be determined in space. IMU 114 may use such information to command motors 110a to 110d to make corrective movements to keep UV 100 in a requested attitude, altitude, and/or position. This information, in turn, may be used by controller 104 to command movements of UV 100 to accomplish a predetermined mission, as will be described further herein. Still further, sensors 118 may include sensors that are mission-specific for UV 100, e.g. light detectors, smoke detectors, etc., and/or sensors that may be needed by other aspects of control system 106. Such sensors may be of any type and technology now known or later developed. Sensors 118 may also include one or more antennae for receiving commands from a remote station, which may be forwarded to other components within control system 106, such as IMU 114, CPU 116, or launch initiator 102.

Launch initiator 102, controller 104, or both may be implemented as discrete components or processors within control system 106, as software modules with functionality expressed in execution on control system 106's processor or processors, or as a hybrid of software and hardware. Launch initiator 102 and/or controller 104 further may be implemented as logical modules, with no physical distinction.

In embodiments, launch initiator 102 may be responsible for ensuring that UV 100 initiates and deploys in a timely and orderly fashion. Upon receiving a trigger signal of a launch event, launch initiator 102 may instruct control system 106 to spin up motors 110a to 110d to an operating speed, and initiate IMU 114 to bring UV 100 into a stable configuration, such as a hover where UV 100 is implemented as a multirotor. Launch initiator 102 may coordinate other necessary operations specific to the implementation of UV 100, such as extending arms, retracting landing gear, deploying sensors, etc. Launch initiator 102 may also signal controller 104 of a successful launch, thereby triggering controller 104 to deploy UV 100 onto its designated mission. In other embodiments, the other necessary operations may be performed after UV 100 has reached the location of its designated mission.

Launch initiator 102 may be triggered to launch UV 100 by an external source, such as a manual trigger from an emergency responder or operator of a vehicle that may be involved in a situation with which UV 100 may assist. Alternatively or additionally, the trigger signal may originate from an automated external source, such as a monitor or detector apparatus configured with sensors to detect an impending situation or an ongoing situation. Automated detection may allow UV 100 to be deployed in scenarios where the vehicle operator may be incapacitated, or emergency responders may be unaware of the situation. Such an apparatus may be located on a vehicle, and may comprise sensors configured to detect conditions indicating an impending situation, such as a sudden deceleration or acceleration that isn't linked to an operator action (e.g. depressing an accelerator or brake pedal, in the case of an automobile), sudden altitude drop (where the vehicle is an aircraft), presence of fire, electronic or mechanical malfunction, etc. Such a trigger signal may be received by a hard connection to control system 106, such as via contacts in a dock, station, launch mechanism, or other apparatus in which UV 100 may be stored while awaiting deployment, or via a wireless signal.

In still other embodiments, data from sensors 118 may be supplied to launch initiator 102, which may use the data to detect conditions to trigger a launch itself, without need for an external signal. In such embodiments, sensors 118 may be configured to detect the environmental factors described above, e.g. sudden acceleration/deceleration, fire, impact, mechanical or electrical failure, etc. In such embodiments, UV 100 may be completely self-contained and autonomous: it may be configured to detect a situation, trigger launch, and then carry out a pre-programmed mission to assist with the situation.

Controller 104 may include specific instructions to guide UV 100 in its intended mission. Controller 104 interfaces with control system 106, which may supply the mechanics of controlling UV 100 to accomplish the programmed mission of controller 104. For example, where UV 100 is a multirotor or helicopter, controller 104 may direct UV 100 to hover in a particular location and gather information via one or more peripheral devices 112 for a predetermined amount of time, following which controller 104 may direct UV 100 to land in a safe location. Various example missions for UV 100 will be described in greater detail herein.

Peripheral devices 112 may include cameras, as depicted in FIG. 1, radio transceivers, audio and/or visual signaling devices, radar, sonar, or any other device suitable for information collection or conveyance that is now known or later developed. Peripheral devices 112 may interface with control system 106, which may further be configured to trigger or otherwise activate one or more peripheral devices 112 on instruction from controller 104, such as signaling a camera to begin capture of video or photos. In other embodiments, peripheral devices 112 may effectively be part of control system 106, may be standalone devices, or may be implemented as a combination, with some functionality provided by control system 106 and some provided directly by the peripheral device 112. An example of such an implementation might be a gimbal-mounted camera, where the gimbal may be controlled by control system 106 to provide stabilization to the mounted camera. The camera, in turn, operates as an autonomous unit, receiving only a start or stop signal from control system 106, and otherwise handling transmission of video images independent of control system 106. Other possible peripheral devices 112 may include aural or visual signaling devices, such as a visible display or audio relay. Upon a signal from controller 104, a visible display may present a predetermined message, or an audio relay may announce a prerecorded message. Alternatively or additionally, such a display or audio relay may convey messages in real time, as received over a wireless link. Audio relay systems likewise may be configured to transmit sound from a situation. Control system 106 may handle none, some, or all functionality of such peripheral devices 112, including any wireless communications and displaying/announcing of messages.

Figure 2:
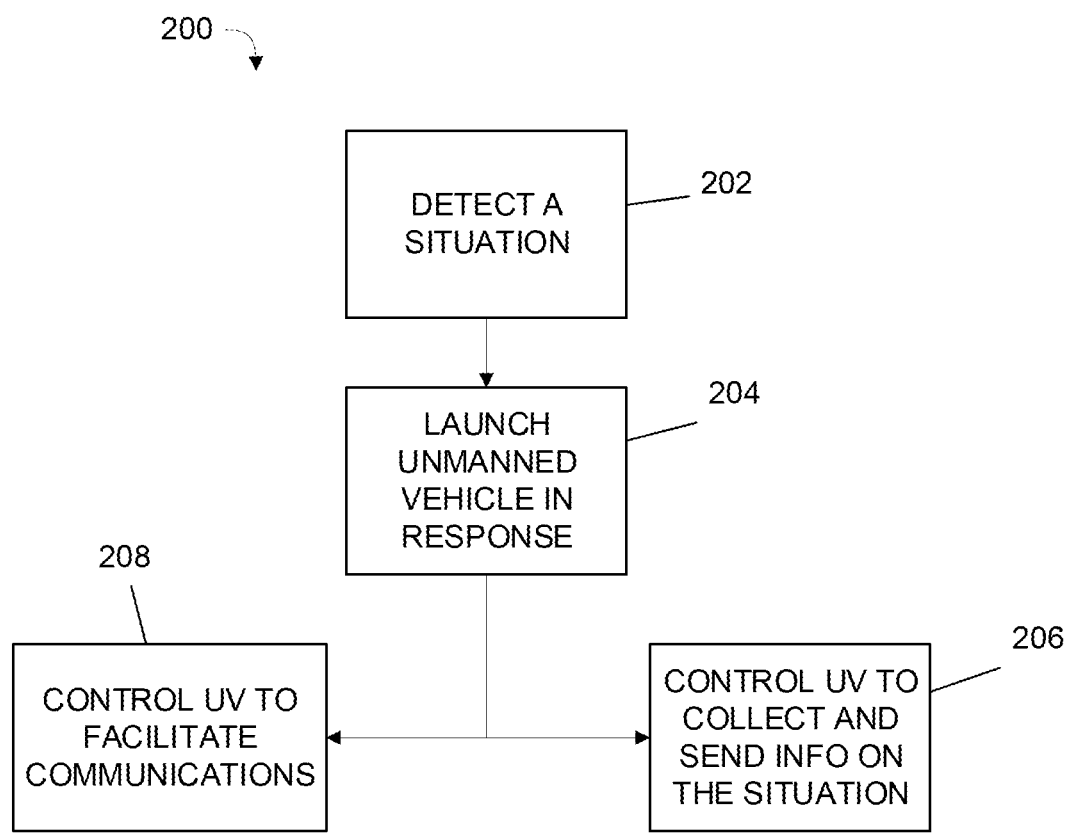
FIG. 2 is a flow chart of one method for a UV to respond to a situation, according to an example embodiment.

FIG. 2 depicts a method 200 whereby a UV, such as UV 100, may be deployed to assist in responding to and managing a situation. The basic tasks of method 200 or variations thereof may be used to accomplish the actions detailed below with respect to FIGS. 3-6. A situation may be detected in block 202, and in response a UV may be launched in block 204. Following launch, in block 206 the UV may be controlled to respond appropriately to the situation, such as collecting and sending information about the situation, including information about any vehicles involved, and/or facilitating communications with the situation and any involved persons, as in block 208.

In block 202, a situation, for purposes of this disclosure, may include traffic incidents, such as collisions or breakdowns; aviation incidents, such as plane crashes or emergency landings; personal emergencies, such as lost or stranded hikers; or accidents involving bicycles (which may also fall under the category of a traffic incident); water-related incidents, such as a stranded, sinking, or sunk vessel; space-related incidents, such as a distressed astronaut, or damaged or disabled space vehicle; or any other similar situation where assistance can be facilitated by an unmanned vehicle. Situations do not need to be emergency in nature: UV 100 may be configured to simply act as a decoupled sensor from a vehicle, e.g. assisting a vehicle in locating a parking location by surveilling a parking lot or parking area and guiding a vehicle to a spot, or conversely, launching from a vehicle on a remote signal from the user, flying to the user and then leading the user back to the vehicle.

"Vehicle" may be any vehicle available for use, such as a passenger vehicle, motorcycle, van, ATV, or transport vehicle such as a bus, truck, ship, airplane, or any other conveyance. Vehicle, as used herein, need not be land-based, nor be configured to operate on a highway. Vehicles may include farm implements, construction vehicles, and off-road vehicles. Still further, vehicles may include personal vehicles such as bicycles and personal conveyances. In some implementations, "vehicle" may include a backpack or other carrying case that a person may wear or take with them, where UV 100 is to be used for personal assistance or to aid in personal situations, e.g. getting lost or stranded while hiking, serving to increase visibility and communications range, etc. In the claims, the term "host vehicle" means a vehicle, as defined above, that may contain or host a UV 100 for launch. The "host vehicle" may be a vehicle involved in the situation or responding to the situation.

Situations may be detected by any manner known or later developed in the relevant art. Detection may come from a variety of sources, such as a first responder or bystander who notifies the appropriate emergency responders upon witnessing an incident, or by a participant in the situation, such as where a person is lost or stranded. Detection may also happen automatically by UV 100 as described above, by way of suitable sensors.

Following detection of the situation, a launch trigger signal may be sent to launch initiator 102 as part of block 204, causing UV 100 to launch from its station. The station may be, for example, on a vehicle involved in the situation, a vehicle responding to the situation, a proximate fixed station, or some other apparatus that may allow UV 100 to keep fueled or charged and allows for quick launching of UV 100. In some cases the station may be equipped with one or more launch assist devices to assist UV 100 in launching, such as chemical propellants like nitroguanidine or sodium azide, commonly used in airbag deployment charges, mechanical means such as a spring, pneumatic means using air pressure, or another suitable mechanism for imparting a launch force to a UV 100 sufficient for UV 100's intended application. As described above with reference to FIG. 1, the trigger signal may originate from a source external to UV 100, or may be generated by launch initiator 102 autonomously of any external source. The trigger signal may be conveyed from either the external source or launch initiator 102 to the station and any associated launch assist device to trigger the station/device to release UV 100.

Once launched, launch initiator 102 signals controller 104 to direct UV 100 according to its predetermined mission or, in some embodiments, set UV 100 to be responsive to remote inputs, or both. Controller 104 may direct UV 100 to collect and send information about the situation, per block 206. Such collection may be done via one or more peripheral devices 112. Similarly, controller 104 may direct UV 100 to facilitate communications from and/or to the situation, which may be accomplished through peripheral devices 112. The data collected about the situation may be any data that would be relevant or useful to a responder to the situation, for a person or organization analyzing the situation, or for any other purpose. Where the collected data is intended for a specific recipient, the type of data collected may be tailored to the recipient's particular needs and purposes. Types of data to be collected include data about the participants in the situation, e.g. a vehicle or vehicles involved in a crash (including a vehicle that may launch a responding UV 100, where the launching vehicle is involved in the situation), persons involved in a personal emergency, etc. Data may include the number of people involved, their condition, the number and status of any vehicles, environmental conditions, the presence and nature of any hazardous conditions, etc. Data collection may be done at a fixed number of times, on a periodic basis, or continually, as necessary to the intended purpose of UV 100.

Turning to FIGS. 3 to 6, various scenarios in which UV 100 may be deployed to assist in managing situations are described. It should be understood that the description of various aspects of method 200 applies equally to the various actions described below.

Figure 3:
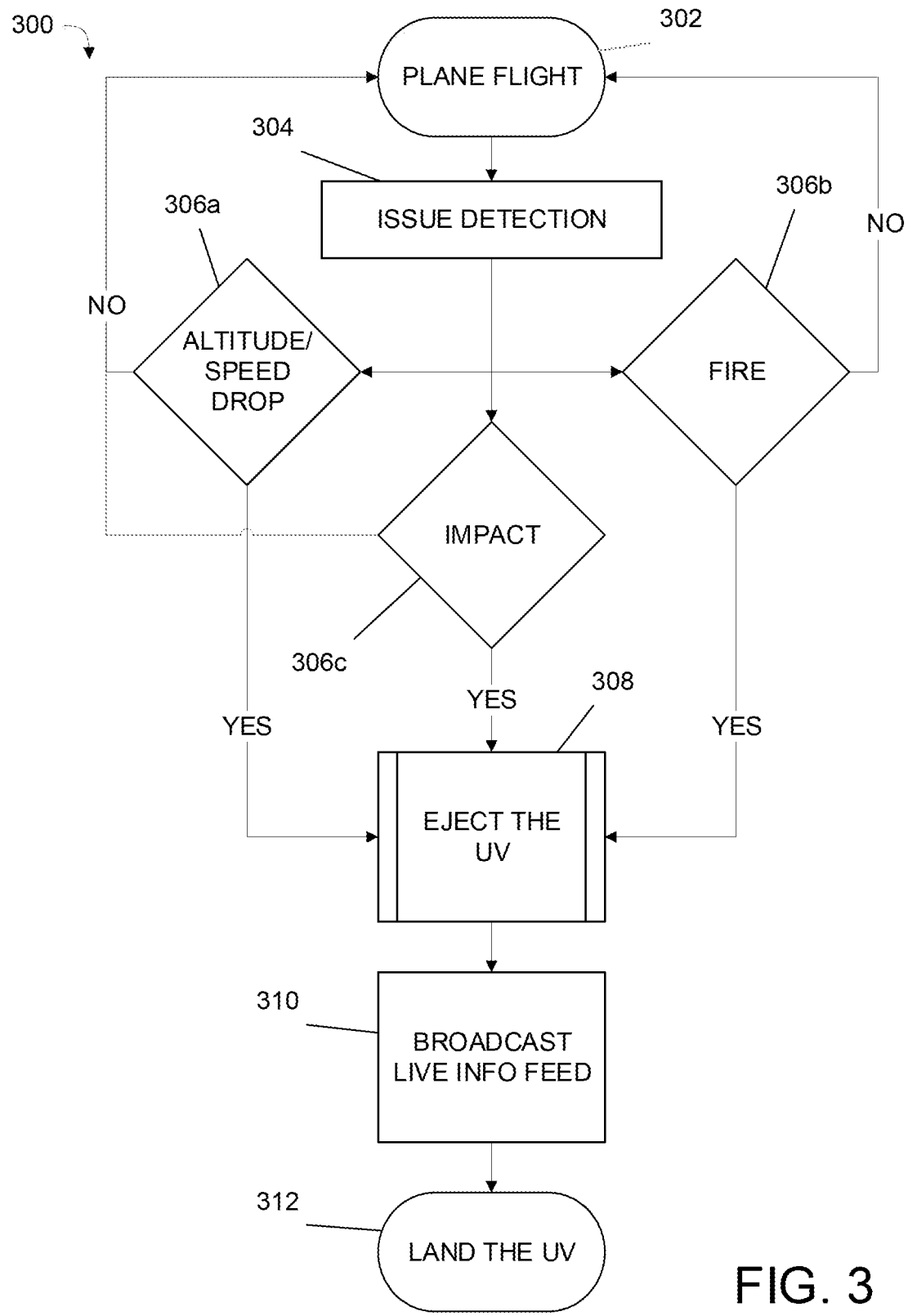
FIG. 3 is a flow chart of the operations performed with or by a UV responding to an aircraft crash situation, according to another example embodiment.

FIG. 3 depicts one possible procedure 300 to be taken for a UV 100 to provide assistance where the situations is an aviation emergency, such as a plane crash. Procedure 300 may involve any sort of aircraft, including an airplane, unmanned vehicle, helicopter, glider, balloon, multicopter, or any other aviation-oriented device. Procedure 300 may also be applied to non-aviation vehicles, such as CA/AD vehicles, cars, trucks, boats, submarines, or other similar vehicles. A person skilled in the relevant art will understand that where procedure 300 is applied to non-aviation vehicles, parameters described herein that are aviation-specific will be modified to comport with the nature of the involved vehicle or vehicles.

During normal plane flight 302, the conditions of flight are monitored for issue detection 304. Issue detection 304 may monitor for conditions indicating an emergency situation such as an altitude or speed drop 306a, presence of fire 306b on board the plane, or an impact 306c, denoted by a sudden uncommanded deceleration or acceleration. Issue detection 304 may also monitor for other conditions indicative of an emergency or pending emergency not depicted here. If no condition 306a to 306c is detected, plane flight 302 continues normally, and issue detection 304 continues to monitor for emergency conditions. Issue detection 304 may monitor continuously or on a periodic basis, such as polling sensors configured to detect emergency conditions, as described above, for any detected conditions at routine intervals.

Issue detection 304 may be accomplished by systems on board the plane, such as the plane's air data-attitude heading reference system (AD-AHRS), flight management system (FMS), or inertial reference system (IRS), which could detect an abnormal flight condition that may lead to an impact and so trigger a launch signal to launch initiator 102. Alternatively, as stated above, the launch signal could be triggered manually by a flight crew member or, if UV 100 is so equipped, by launch initiator 102 on UV 100 itself via sensors 118 detecting conditions leading to a crash and signaling launch initiator 102 to cause UV 100 to launch.

If a condition 306a, 306b, or 306c is detected, indicating that the plane is in imminent danger of crashing, UV 100 may be ejected 308 by way of the trigger signal as described above. UV 100 may be stored on the plane itself, in some embodiments, and so may be ejected into the air while the plane is mid-flight. In other embodiments, UV 100 may be located on a fixed ground station proximate to the location of the distressed plane, and can be signaled by the plane remotely when sensors on-board the plane detect a condition 306a to 306c. Such a signal may come via an emergency broadcast from the plane, which may automatically trigger deployment of a UV 100 to travel to and assist in a crash site. Upon ejection or deployment, launch initiator 102 may configure UV 100 for flight as described above with reference to FIG. 1, and signal controller 104 to begin directing UV 100 on its preprogrammed mission.

Once ejected 308, launch initiator 102 may spin up and stabilize UV 100, and controller 104 may cause UV 100 to initiate a hover or orbit over the location (either actual or last known) of the plane and commence broadcasting information about the situation. This broadcast may be over a known radio frequency, such as the standard aviation emergency channels of 121.5 MHz or 406 MHz, over a known air traffic control (ATC) frequency, or another suitable radio frequency. The information may additionally or alternatively be transmitted to a remote server for storage and subsequent retrieval, and/or directly to an emergency responder or similar agency. Information being broadcast may include location information (e.g. geographic coordinates) of the crash and/or plane, such as may be obtained from GPS or another global navigation system, black box information from the plane, information about the plane such as type, heading before the crash, number of souls on board, crash vector information, information including or related to the reason or reasons for the crash/emergency, and/or any other information that may be useful to responders. Depending upon the package of sensors 118 and peripheral devices 112 on UV 100, UV 100 may remain on station over the site of the plane crash to give responders sufficient time and information to equip, locate the downed plane, and begin search and rescue operations.

Following either the arrival of responders or the exhaustion of UV 100's power supply (e.g. batteries or fuel being depleted), UV 100 may automatically land. In other implementations, UV 100 may swap for another UV 100, if available, to provide continued support for the situation.

Figure 4:
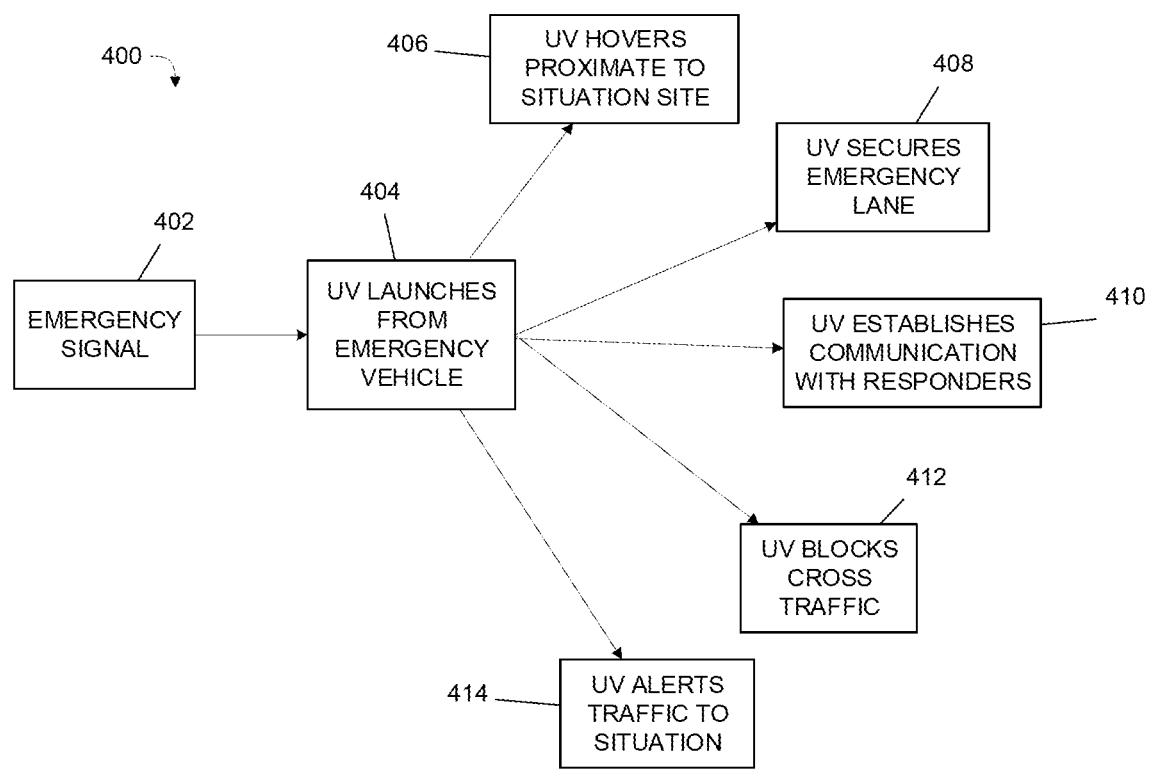
FIG. 4 is a flow chart of the operations performed with or by a UV responding to a traffic situation from an emergency vehicle, according to another example embodiment.

FIG. 4 depicts a possible series of actions 400 that may be taken by a UV 100 in response to a traffic situation, such as a collision. Upon receipt of an emergency signal 402, a UV 100 may be launched 404 from an emergency vehicle. After launch, controller 104 may control UV 100 to perform one or more tasks to assist with managing the traffic situation. Such tasks may include hovering proximate to the situation site 406, securing an emergency lane 408 for responding vehicles to quickly access the situation, establishing communication 410 between the situation site and responders in advance of their arrival, blocking any cross traffic 412 to further assist responders in reaching the situation, and alerting traffic 414 to the presence of the situation.

In embodiments, UV 100 may be implemented as a flying vehicle such as a multicopter, and may be stored on a response vehicle. UV 100 may receive the emergency signal 402 to trigger a launch from an operator of the response vehicle. UV 100 may be stored in a fashion that allows it to launch directly from the response vehicle upon receiving the emergency signal 402. Launch initiator 102 may be configured to deploy UV 100 into a flying condition, including spinning up motors 110a to 110d, initiating the control system 106, and signaling any docking or launch mechanisms on the response vehicle to release UV 100. Launch 404 may be effected with the assistance of a launching mechanism as described above with reference to FIG. 2.

Following launch 404, controller 104 may direct UV 100 through control system 106 to hover or orbit 406 proximate to the site of the situation. UV 100 may be configured to study the situation through peripheral devices 112 to determine further actions that may be useful to assist in responding to the situation. Gathered information may be transmitted back to the emergency vehicle launching UV 100, to provide responders an initial briefing on the situation conditions. In this fashion, UV 100 effectively acts as a decoupled sensor or sensors for the emergency responder and/or emergency vehicle. In some embodiments, information from peripheral devices 112 may also or alternatively be provided to an artificial intelligence (AI) algorithm to analyze and determine additional operations to take. This AI algorithm may be formed by control system 106 (including controller 104), or, in other embodiments, may be transmitted to a remote system for AI processing.

Other tasks directed by controller 104 may include securing 408 one or more emergency lanes, where the situation is sited on a highway or other thoroughfare. Securing an emergency lane may facilitate rapid access by any responding vehicles, such as the emergency vehicle launching UV 100. UV 100 may secure 408 an emergency lane by use of visual and/or audio signals, as well as potentially deploying warning devices such as hazard cones, flares, triangle signs, or other similar devices. In addition to securing an emergency lane, controller 104 may have UV 100 block or divert 412 any approaching or cross traffic, possibly using similar methods to those used to secure the emergency lane, or another suitable method. As part of traffic management, controller 104 may also, or alternatively, direct UV 100 to alert traffic 414 that is approaching the situation. Such an alert 414 may be visual, aural, a combination of both, or another suitable way of providing an effective alert to approaching traffic. The alert 414 may include information about the nature of the situation, the distance to the situation, any lane closures or diversions, and/or any other information that may be relevant to approaching traffic.

Controller 104 may also direct UV 100 to establish 410 two-way communications between the situation and responders, along with providing situation information to responders. Two-way communications may be provided by audio or video relay (as described above), via radio communications relay, such as creating a WiFi or cellular hotspot, a combination of any of the forgoing, or any other communication means suitable to the particular situation. Where audio relay is provided by UV 100, responders may be able to directly communicate with persons involved in the situation, e.g. crash victims, to provide assurance, determine injuries, and any other information important for providing effective assistance.

Figure 5:
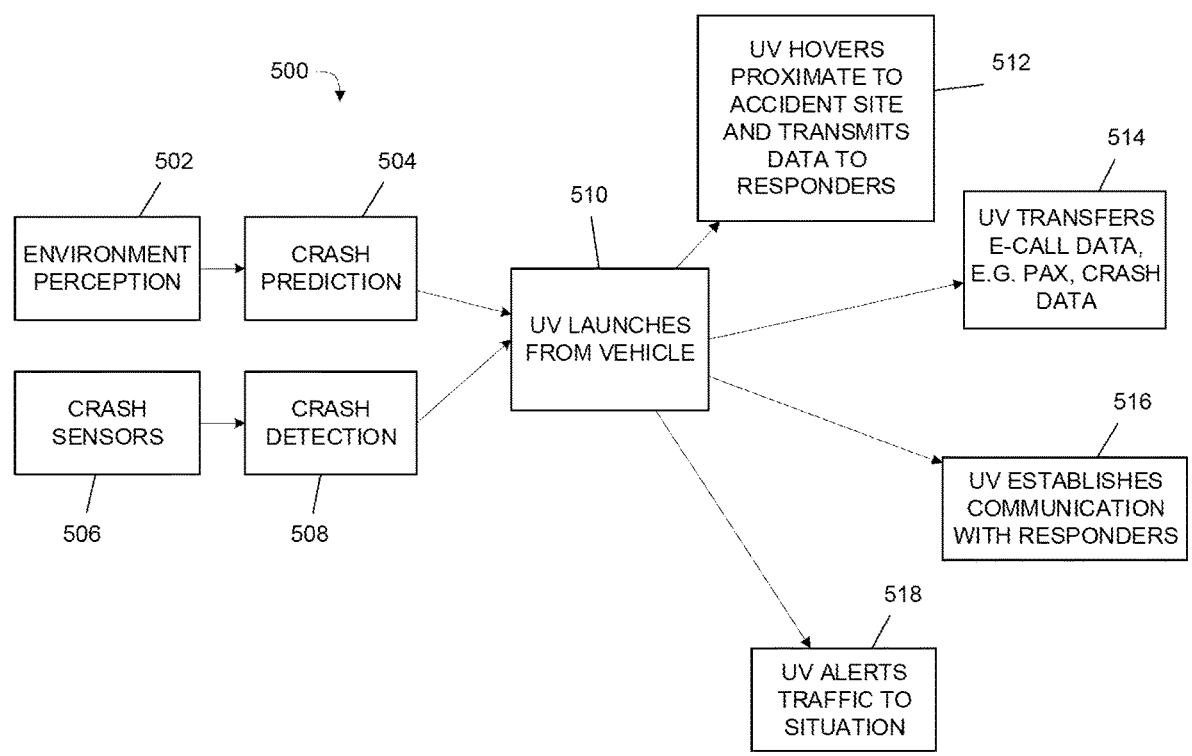
FIG. 5 is a flow chart of the operations performed with or by a UV responding to a traffic situation from a vehicle involved in the situation, according to another example embodiment.

FIG. 5 depicts possible actions 500 for a UV 100 that may be launched from a vehicle that may itself be involved in a situation. A launch of UV 100 may be triggered either upon a crash detection, or in anticipation of an imminent crash. Sensors for environmental perception 502 in a vehicle (such as may be equipped to a computer assisted/autonomous driving (CA/AD) vehicle) may detect an obstacle on a collision trajectory with the vehicle and predict the impending crash 504. In other vehicles, specific crash sensors 506, such as sensors commonly used to coordinate airbag deployment, may detect a crash in progress. Still further, sensors for environmental perception 502 or crash sensors 506 may be incorporated into UV 100, to allow launch initiator 102 to trigger a launch, which may provide added assurance of UV 100 launch, such as where the collision inadvertently prevents an external trigger signal from deploying UV 100. The predicted or detected crash may trigger launch initiator 102 to launch UV 100 from the vehicle 510. As with FIG. 4, the launch may be assisted by an apparatus as discussed with reference to FIG. 2.

Following launch, controller 104 may direct UV 100 to hover or orbit 512 proximate to the crash site, analyze the scene, and possibly relay such information to responders to the crash, similar to hovering 406 and establishing 410 actions described above with reference to FIG. 4. Such information relayed to responders may include data 514 on passengers in the involved vehicles, crash data that may be recorded by vehicle sensors, vehicle positions, etc. As with actions 400, UV 100 may be directed by controller 104 to establish 516 two-way communication with approaching responders, and may further alert 518 any traffic that may be approaching the situation, similar to alert 414.

Figure 6:
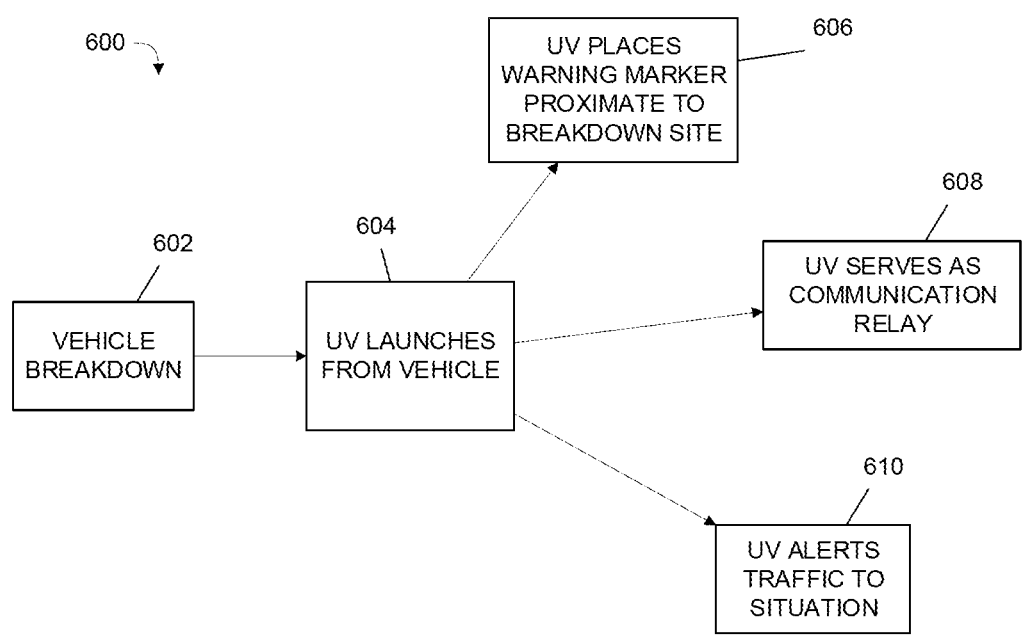
FIG. 6 is a flow chart of the operations performed with or by a UV responding to a vehicle breakdown, according to another example embodiment.

FIG. 6 illustrates actions 600 that may be used for a UV 100 to respond to situations involving a vehicle breakdown 602 (e.g. non-crash involved). Upon a vehicle breakdown 602, UV 100 is triggered to launch 604 from the disabled vehicle. This trigger signal may be initiated by an operator of the disabled vehicle, or automatically by vehicle systems that may be able to detect the breakdown condition.

Following launch, controller 104 may direct UV 100 to place 606 warning markers proximate to the breakdown site, act as a communication relay 608 with responders, and/or alert 610 approaching traffic to the breakdown. Placing 606 warning markers may include UV 100 automatically deploying devices such as triangles, flares, lights, cones, or aural warning devices, or any other warning device or implement that may be suitable to the conditions. UV 100 acting as a communication relay 608 and providing alerts 610 to approaching traffic may be carried out as described above with reference to FIGS. 4 and 5.

Figure 7:
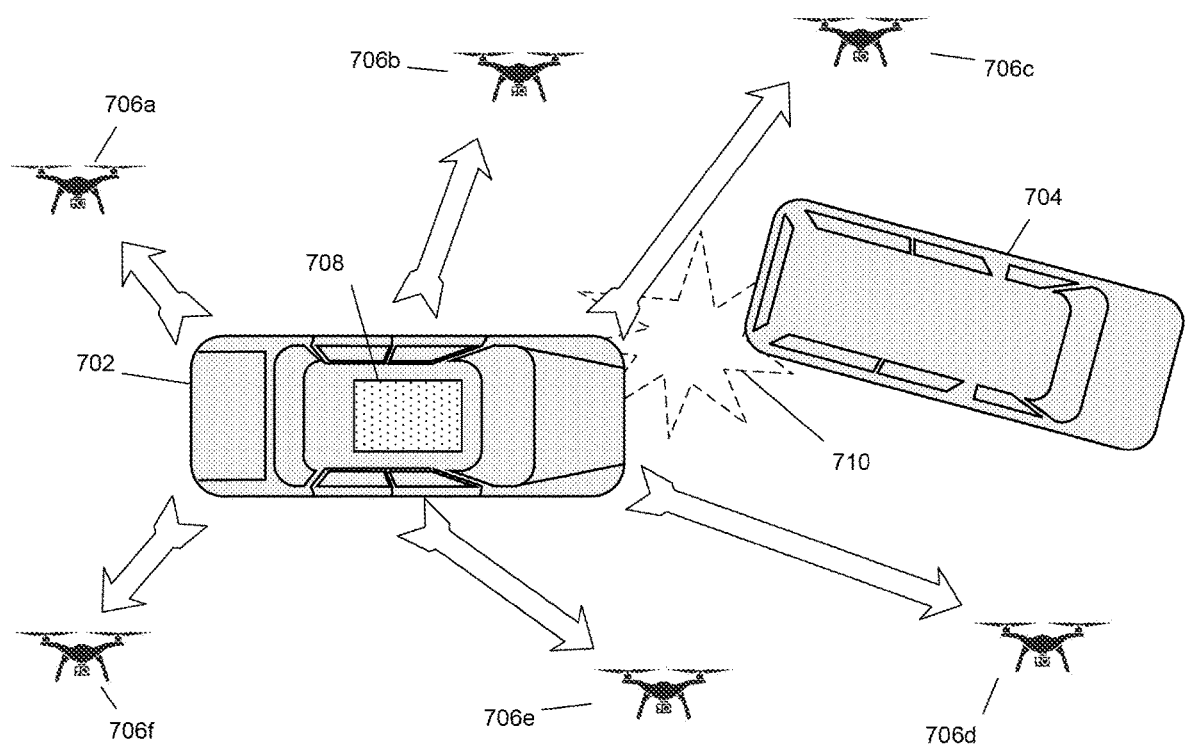
FIG. 7 is a diagram of a crash situation involving two vehicles, showing how a plurality of UVs can capture the situation, according to another example embodiment.

FIG. 7 depicts another embodiment utilizing a plurality of UVs 100 to capture an impending collision, or a collision in progress. A first vehicle 702 is imminently set to collide with a second vehicle 704. Upon detection of the imminent collision, a plurality of UVs 706a, 706b, 706c, 706d, 706e and 706f, each of which may be an implementation of UV 100, may be launched from a launch apparatus 708. Each UV 706a to 706f may be equipped with a peripheral device 112 that is a camera. Upon launch, each UV 706a to 706f may travel a predetermined distance from collision point 710, and each in a different direction, as depicted in FIG. 7. By doing so, each UV 706a to 706f may be able to capture the collision from a different perspective, to potentially reveal aspects of the collision that might not otherwise be captured from a single perspective.

First vehicle 702 may be a CA/AD vehicle, with the various sensors enabling autonomous or semi-autonomous operation also serving to detect an imminent or in-progress collision, such as accelerometer data indicating a rapid change in speed, and automatically send a trigger signal to launch apparatus 708 and/or each UV 706a to 706f. As described above, in some embodiments UVs 706a to 706f may be configured to independently detect an impending collision and generate the launch trigger signal. Where UVs 706a to 706f can detect a collision, the UVs and launch apparatus 708 may be configured so that only one or a subset of UVs 706a to 706f need detect a collision and generate a launch trigger signal. Still other embodiments may require at least two UVs 706a to 706f, or a single UV and a detector on first vehicle 702, to detect and agree upon a detected collision before a launch is triggered, which may help prevent false positives and accidental launches.

Launch apparatus 708 may include one or more launch assistance devices as described above with reference to block 204 in FIG. 2. While FIG. 7 depicts launch apparatus 708 as located on the roof of first vehicle 702, it should be understood that launch apparatus 708, and by extension UVs 706a to 706f, may be located on any suitable portion of first vehicle 702 that allows UVs 706a to 706f to be deployed in an unobstructed manner. Launch apparatus 708 may be configured to launch each of the plurality of UVs 706a to 706f in a predetermined direction to help optimize the varying perspectives to be captured by each UV. In some embodiments, launch apparatus 708 may have each UV 706a to 706f secured via guide rails or a similar guidance mechanism, which may be preset to desired launch angles. As each UV 706a to 706f is to be deployed from a vehicle that is potentially rapidly decelerating from a high speed, launch apparatus 708 may be configured to vary the amount of force used to eject each UV 706a to 706f, and may further be configured to vary the launch force across each UV. For example, UVs that will be launched roughly in the direction of travel may require less launch force than UVs launched in a direction opposite to first vehicle 702's direction of travel. Conversely, UVs launched in the direction of travel will have an added momentum from first vehicle 702, while UVs launched in the opposing direction will have a decreased momentum. Some embodiments may vary the launch force by varying the amount of propellant that is ignited, or adjusting tension where launch apparatus 708 uses mechanical launch means such as a spring.

While FIG. 7 depicts six UVs 706a to 706f, any number of UVs may be employed depending upon the camera package installed on each UV and/or the number of different perspectives desired to capture a collision. Each UV may capture still images, video clips, or both. Following capture and retrieval of each UV's images, the captured images may be used to create a reconstruction of the collision scene (in some embodiments, in 3D). Where the images are captured as video clips starting just prior to the actual collision, a video model may be generated that allows the collision as it happens to be viewed from virtually any angle, also in 3D in some embodiments.

It should be recognized that although FIG. 7 specifically depicts the plurality of UVs 706a to 706f capturing a collision for later reconstruction, the situation need not be a collision. A plurality of UVs such as UVs 706a, 706b, 706c, 706d, 706e, and 706f (or some other greater or lesser number) may be used to capture any situation, emergency or non emergency, where a reconstruction or 3D visualization may be desired. Also, UVs 706a to 706f have been described as having similar equipments. In alternate embodiments, they may have different equipments that complement each other to collect different sensor data to provide a more comprehensive capture of the situation.

Figure 8:
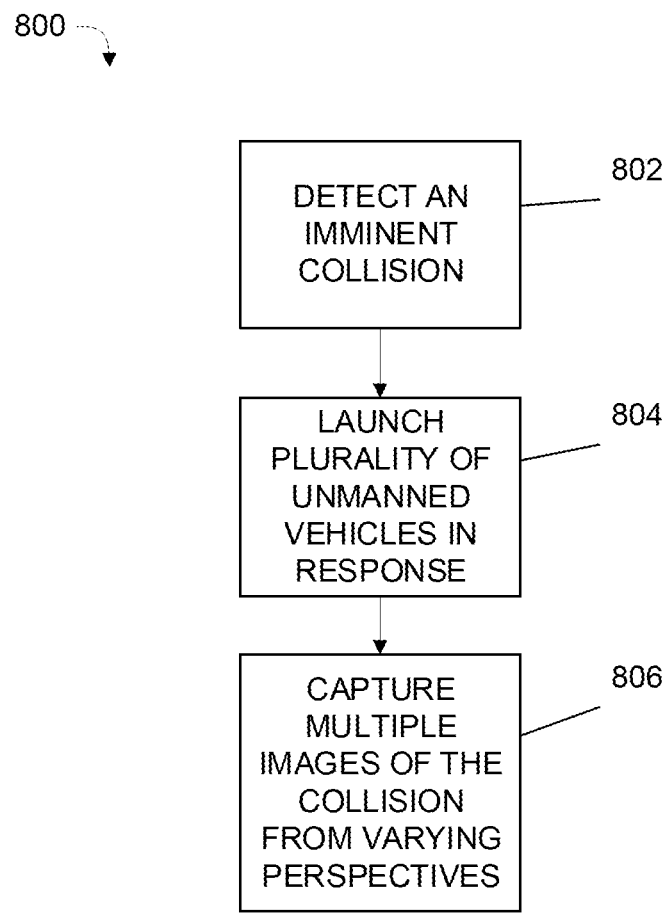
FIG. 8 is a flow chart of a method for a plurality of UVs to capture a crash situation, according to an example embodiment.

FIG. 8 depicts a method 800 that may be executed with a UV that is part of UV 706a to 706f. In block 802, an imminent collision is detected. Detection of the collision can be accomplished as detailed above with respect to FIGS. 3-5. Specifically, sensors in first vehicle 702 may detect the presence of second vehicle 704 in the path of first vehicle's 702 path of travel and, based upon the relative velocity of first vehicle 702 with respect to second vehicle 704, may determine that a collision is unavoidable. A signal to trigger launch of UVs 706a to 706f may be generated in block 804 and sent to each UV and/or launch apparatus 708. Following receipt of the signal, the launch initiator 102 in each UV 706a to 706f may configure and cause its respective UV to launch. Following launch, each launch initiator 102 may signal its respective controller 104 to orient its UV so that each camera approximately faces the collision point 710. Finally, in block 806 each UV begins capture of images of the collision. The captured images may each offer a different perspective by virtue of each UV 706a to 706f being located in a unique position relative to the collision point 710. Following capture of images of the collision, controller 104 in each respective UV 706a to 706f may direct each UV to automatically land in a safe location away from the collision.

In some embodiments, the images captured by each UV 706a to 706f may be stored on each UV for subsequent retrieval once each UV 706a to 706f is physically recovered from their landing point. In other embodiments, each UV 706a to 706f may transmit the captured images over a wireless network to a remote server or cloud service. The wireless network may be a locally available WiFi network, a cellular network, or another suitable wireless network technology that allows each UV 706a to 706f to transmit images to the remote server.

Figure 9:
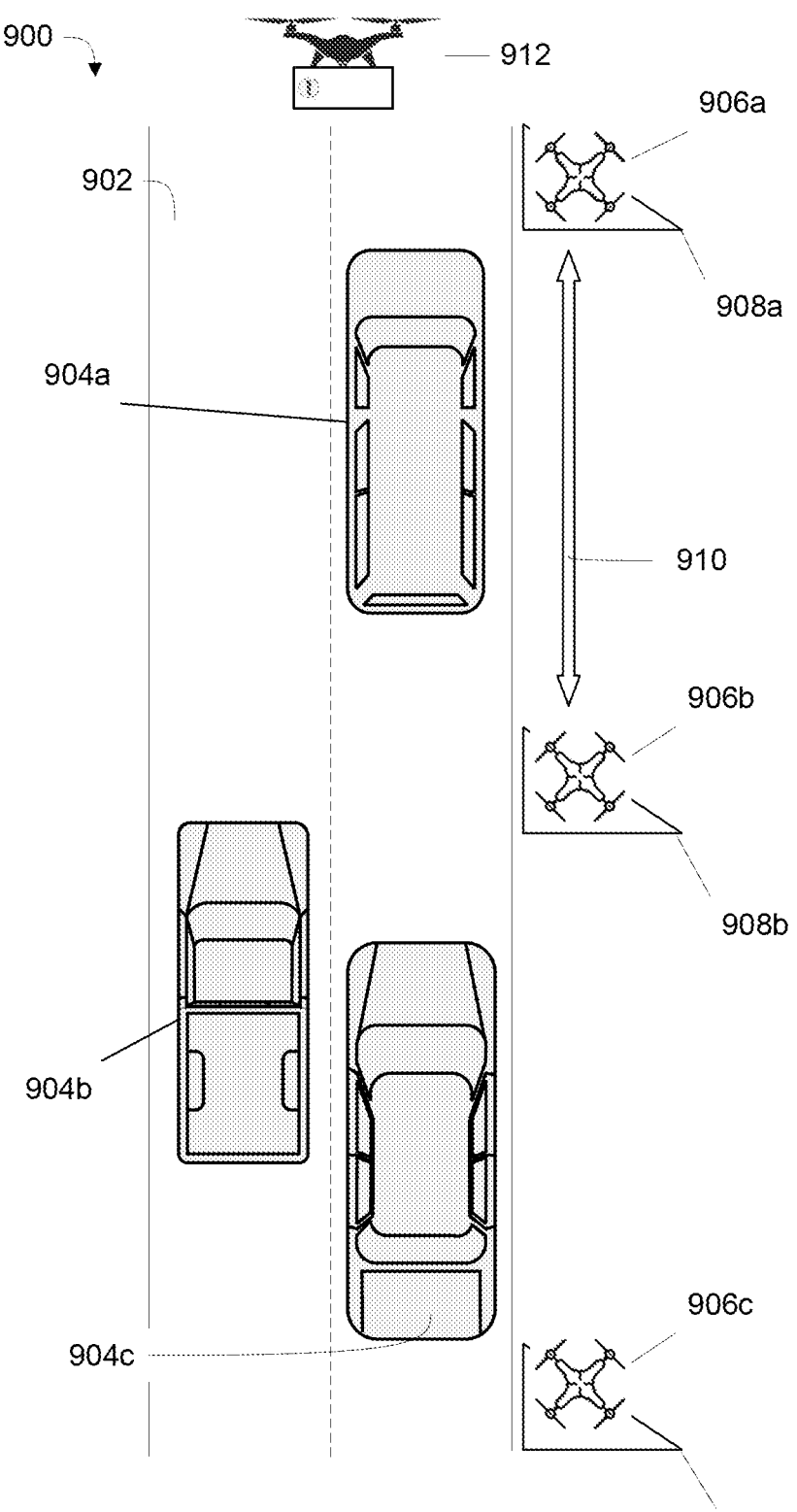
FIG. 9 is a diagram of a highway with a plurality of UVs for responding to traffic incidents stationed along its length, according to an example embodiment.

FIG. 9 depicts a use of a UV 100 in connection with a system 900 for dynamically alerting traffic on a roadway 902 of upcoming situations, such as a traffic collision or accident. A plurality of vehicles 904a, 904b, and 904c are shown as an example of a traffic flow on roadway 902. Disposed along the side of roadway 902 may be a plurality of UVs 906a, 906b, and 906c, each of which may be docked in a station 908a, 908b, and 908c. Each station 908a to 908c may be equipped to charge each respective UV 906a to 906c. Each station and UV may be separated by a regular distance 910. The amount of distance 910 may be selected to ensure that the response time to a detected situation by a UV 906a to 906c is kept at or below a pre-determined threshold. The distance may further be selected to allow UVs located in stations adjacent to a responding station/UV to feasibly act as back-ups if and when a responding UV runs low on battery or fuel, and so needs to return to return to its designated station.

On detection of a situation, a UV 912 may be launched to dynamically alert the drivers of vehicles 904a, 904b and 904c, for example, to the presence of the situation. UV 912, along with UVs 906a, 906b and 906c, may be implementations of UV 100. It should be understood that the total number of UVs will depend upon the length of roadway 902 desired to be covered by system 900.

Stations 908*a*, 908*b* and 908*c* each may be equipped with a charging apparatus to keep its respective UV 906*a*, 906*b* and 906*c* charged or fueled, and so ready to deploy when needed. Furthermore, stations 908*a* to 908*c* may be configured to accept, and possibly charge, multiple UVs, allowing UVs to move between stations as may be needed to respond to a situation and to recharge. Each station may be in communication with a central authority or dispatch for responders to enable receipt of a launch trigger signal. Alternatively or additionally, each UV may be equipped to receive a trigger signal directly and launch via launch initiator 102, receiving the trigger signal either wirelessly or via the station.

Figure 10:
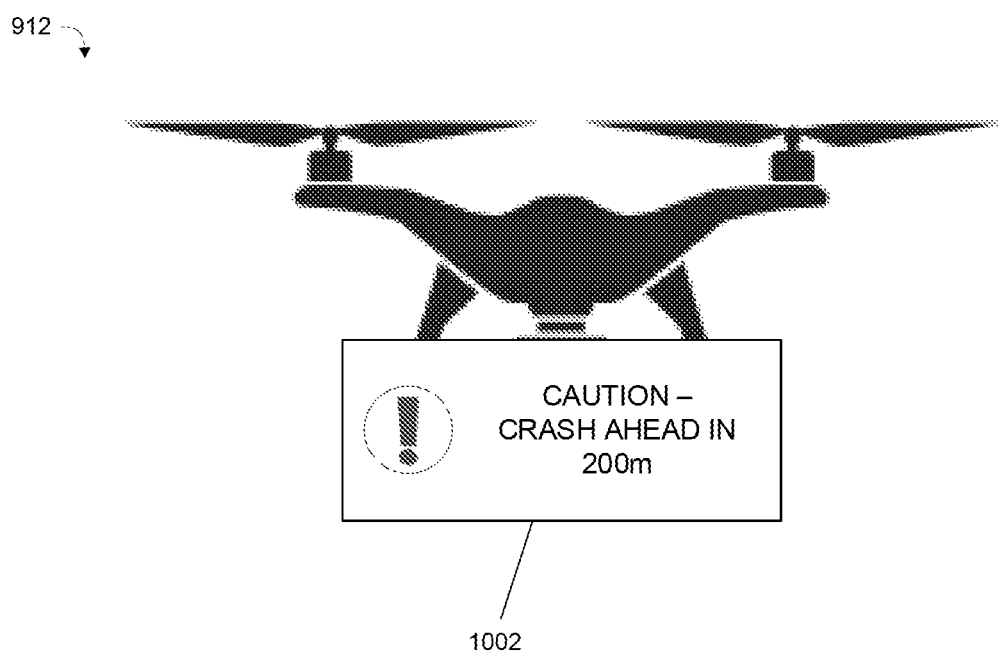
FIG. 10 is a front view of a UV equipped with a visual sign for alerting drivers to a traffic situation, according to another example embodiment.

FIG. 10 depicts a close-up front view of UV 912, which may be equipped with a display 1002 for providing visual alerts to drivers of vehicles on roadway 902. Display 1002 corresponds to a peripheral device 112 on UV 100, and may be controlled by control system 106 to supply dynamic messages. Display 1002 may be selected to be a size that is easily visible to drivers on roadway 902. Further, UV 912 may include aural alerts, such as sirens and/or loudspeakers, as well as other visual alerts such as flashing lights, to better capture the attention of drivers on roadway 902. As shown in FIG. 10, display 1002 may present a message alerting drivers to the presence of a situation, the type of situation (e.g. a collision or crash), as well as the estimated distance to the situation. Other information may include data such as estimated delays, estimated time to clear the situation, hazard warnings depending on the nature of the crash (e.g. the crash involved dangerous cargo), or any other information that may be pertinent to drivers on roadway 902.

Figure 11:
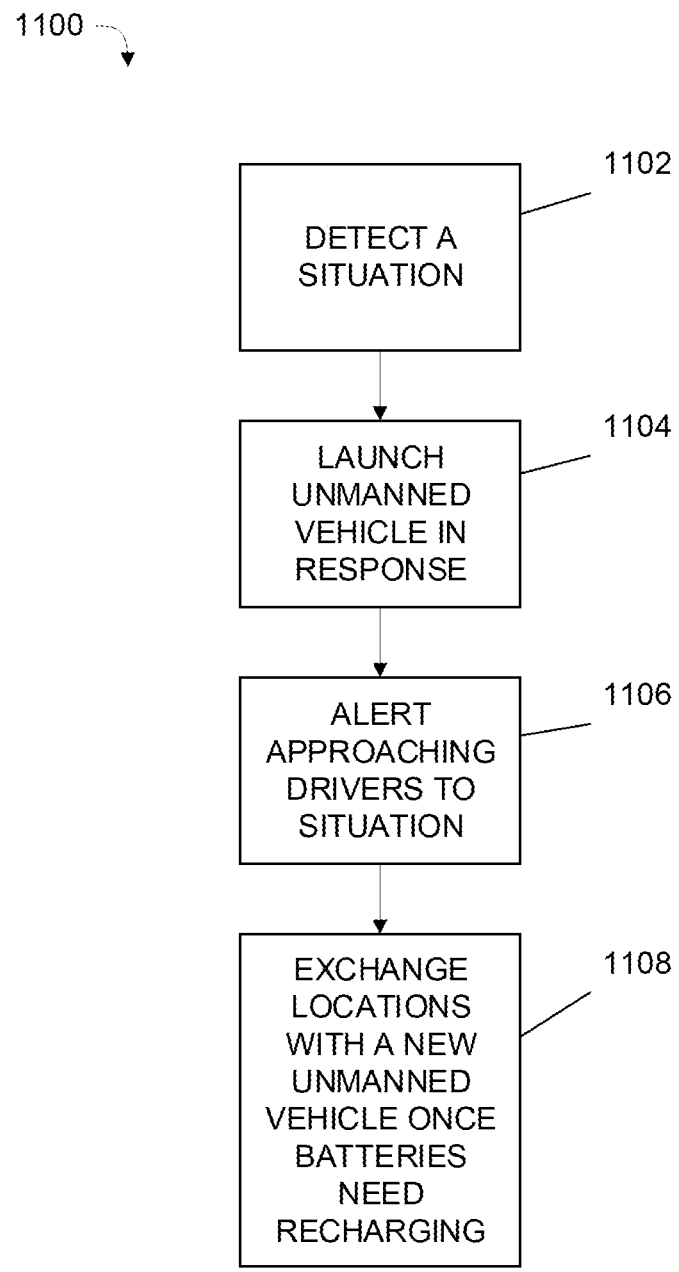
FIG. 11 is a flow chart of a method for a UV along a roadside to respond to a traffic situation, according to yet another example embodiment.

FIG. 11 illustrates a possible method 1100 to be employed with system 900, to provide situational alerts to drivers on a roadway 902. In block 1102, a situation is detected, which triggers the launch of one or more UVs in block 1104. The launched UV or UVs deploy over the roadway 902 to alert drivers approaching the situation in block 1106. Finally, if the situation is not resolved before the UV runs low on battery or fuel, the UV may be relieved by a new UV from a nearby station in block 1108, freeing the UV to return to its designated station for recharging or refueling. Upon resolution of the situation, UV 912 may be signaled to discontinue its mission and return to its station.

The situation may be detected, in block 1102, as described with respect to block 404 of FIG. 4; namely, an emergency responder, other driver on roadway 902, and/or participant in the situation may report the situation. An emergency responder or responding authority may be responsible for triggering the launch of a UV 912 most proximate to the situation, per block 1104. Upon launch, UV 912 may be directed by controller 104 to station itself a suitable distance from the situation so as to provide an effective alert for drivers on roadway 902. This distance may be predetermined, or may be dynamically determined on the basis of roadway 902 conditions. Controller 104 may further direct UV 912 to scan and analyze the situation and traffic proximate to the situation. UV 912 may be configured to detect various aspects of the situation as well as traffic. For example, vehicles may possess various placards indicating the types of cargo being carried, e.g. explosive, oxidizers, flammable, etc. UV 912 may be able to detect these placards and use the recognized information to both alert drivers to the nature of the cargo involved and/or notify responders in advance to their arrival. Similarly, UV 912 may be able to recognize the end of a traffic jam and position itself prior to the end of the jam, to alert, per block 1106, oncoming drivers to the presence of the jam ahead to give the drivers ample opportunity to slow down. UV 912 may further monitor the location of the end and change its position dynamically as traffic conditions change. Moreover, recognizing the end of the jam may allow UV 912 to notify approaching drivers of the distance to the situation.

Finally, each UV may have a finite flight time, defined by its battery or fuel capacity. In block 1108 a UV in a hover may automatically return to a proximate station to charge once its battery drops to a predetermined threshold. When doing so, it may signal another UV to assume its position alerting traffic. This signal may be issued by control system 106 on the depleted UV, and may be transmitted wirelessly. The signal may be transmitted to a station or a central base station, which may determine a replacement UV and coordinate dispatching the replacement. In other embodiments, the depleted UV may directly contact a proximate replacement UV, such as a UV that is already staged at a proximate station. As the replacement UV takes over, it in turn may signal another UV at a station proximate to the situation or adjacent to the UV's station to prepare for a possible subsequent replacement. The depleted UV may return to its base station (which may or may not be the most proximate station to the UV) automatically as directed by controller 104 and begin recharging.

Figure 12:
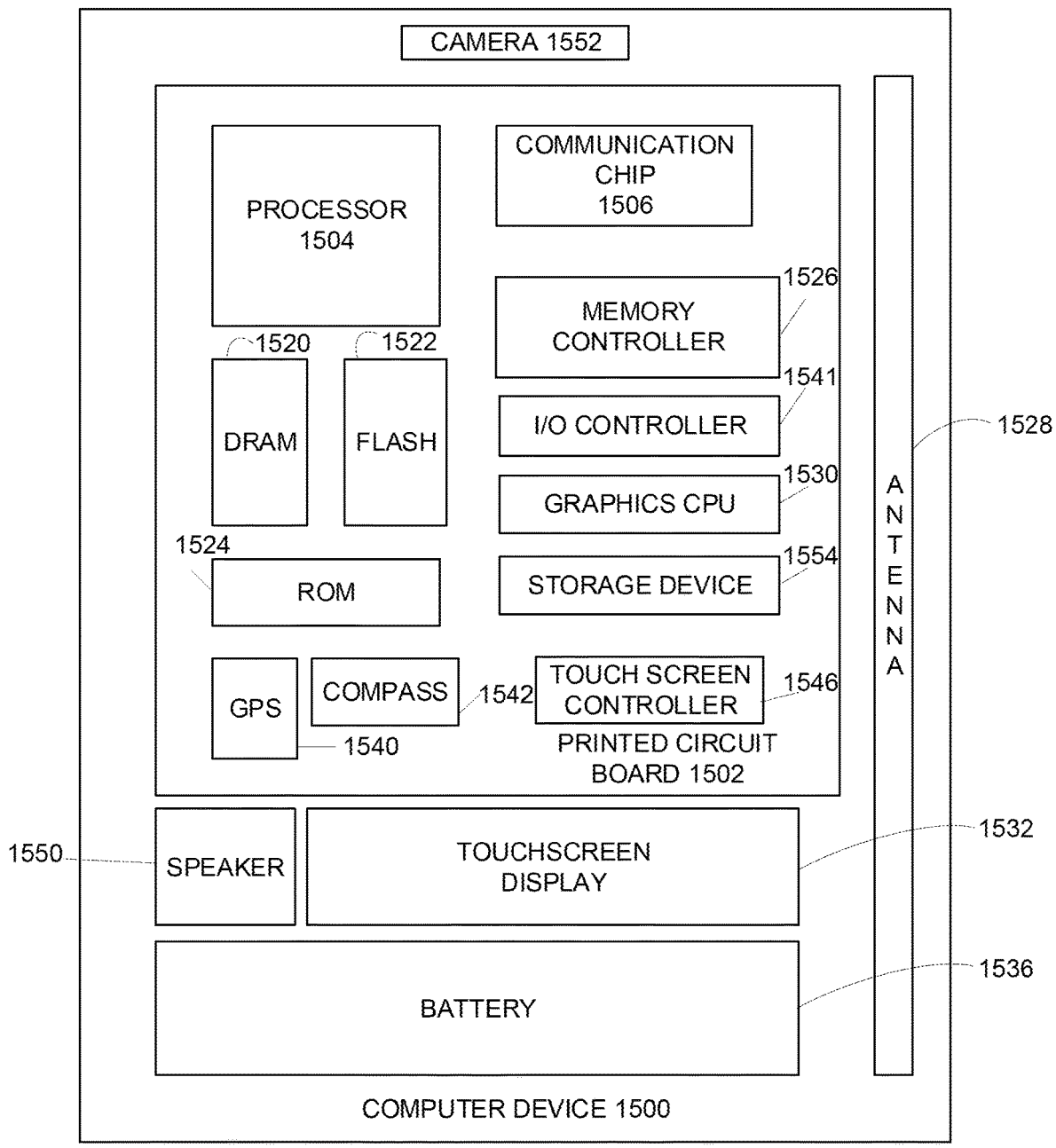
FIG. 12 is a block diagram of an example computer that can be used to implement some or all of the components of the UV of FIG. 1.

FIG. 12 illustrates an example computer device 1500 that may employ the apparatuses and/or methods described herein (e.g., the control system 106 and associated components launch initiator 102 and controller 104), in accordance with various embodiments. As shown, computer device 1500 may include a number of components, such as one or more processor(s) 1504 (one shown) and at least one communication chip 1506. In various embodiments, the one or more processor(s) 1504 each may include one or more processor cores. In various embodiments, the one or more processor(s) 1504 may include hardware accelerators to complement the one or more processor cores. In various embodiments, the at least one communication chip 1506 may be physically and electrically coupled to the one or more processor(s) 1504. In further implementations, the communication chip 1506 may be part of the one or more processor(s) 1504. In various embodiments, computer device 1500 may include printed circuit board (PCB) 1502. For these embodiments, the one or more processor(s) 1504 and communication chip 1506 may be disposed thereon. In alternate embodiments, the various components may be coupled without the employment of PCB 1502.

Depending on its applications, computer device 1500 may include other components that may be physically and electrically coupled to the PCB 1502. These other components may include, but are not limited to, memory controller 1526, volatile memory (e.g., dynamic random access memory (DRAM) 1520), non-volatile memory such as read only memory (ROM) 1524, flash memory 1522, storage device 1554 (e.g., a hard-disk drive (HDD)), an I/O controller 1541, a digital signal processor (not shown), a crypto processor (not shown), a graphics processor 1530, one or more antennae 1528, a display (not shown but could include a monitor, alphanumeric display, or another display technology suitable to display any appropriate information and/or user interface), a touch screen display 1532, a touch screen controller 1546, a battery 1536, an audio codec (not shown), a video codec (not shown), a global positioning system (GPS) device 1540, a compass 1542, an accelerometer (not shown), a gyroscope (not shown), a speaker 1550, a camera 1552, and a mass storage device (such as hard disk drive, a solid state drive, compact disk (CD), digital versatile disk (DVD)) (not shown), and so forth.

In some embodiments, the one or more processor(s) 1504, DRAM 1520, flash memory 1522, and/or storage device 1554 may include associated firmware or software (not shown) storing programming instructions configured to enable computer device 1500, in response to execution of the programming instructions by one or more processor(s) 1504, to practice all or selected aspects of the autonomous UV response operations earlier described with references to FIGS. 1-11. In various embodiments, these aspects may additionally or alternatively be implemented using hardware separate from the one or more processor(s) 1504, flash memory 1522, or storage device 1554.

The communication chips 1506 may enable wired and/or wireless communications for the transfer of data to and from the computer device 1500. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 1506 may implement any of a number of wireless standards or protocols, including but not limited to IEEE 802.20, Long Term Evolution (LTE), LTE Advanced (LTE-A), General Packet Radio Service (GPRS), Evolution Data Optimized (Ev-DO), Evolved High Speed Packet Access (HSPA+), Evolved High Speed Downlink Packet Access (HSDPA+), Evolved High Speed Uplink Packet Access (HSUPA+), Global System for Mobile Communications (GSM), Enhanced Data rates for GSM Evolution (EDGE), Code Division Multiple Access (CDMA), Time Division Multiple Access (TDMA), Digital Enhanced Cordless Telecommunications (DECT), Worldwide Interoperability for Microwave Access (WiMAX), Bluetooth, derivatives thereof, as well as any other wireless protocols that are designated as 3G, 4G, 5G, and beyond. The computer device 1500 may include a plurality of communication chips 1506. For instance, a first communication chip 1506 may be dedicated to shorter range wireless communications such as Wi-Fi and Bluetooth, and a second communication chip 1506 may be dedicated to longer range wireless communications such as GPS, EDGE, GPRS, CDMA, WiMAX, LTE, Ev-DO, and others.

In various implementations, the computer device 1500 may be a laptop, a netbook, a notebook, an ultrabook, a smartphone, a computer tablet, a personal digital assistant (PDA), a desktop computer, or a server. In further implementations, the computer device 1500 may be any other electronic device that processes data.

Figure 13:
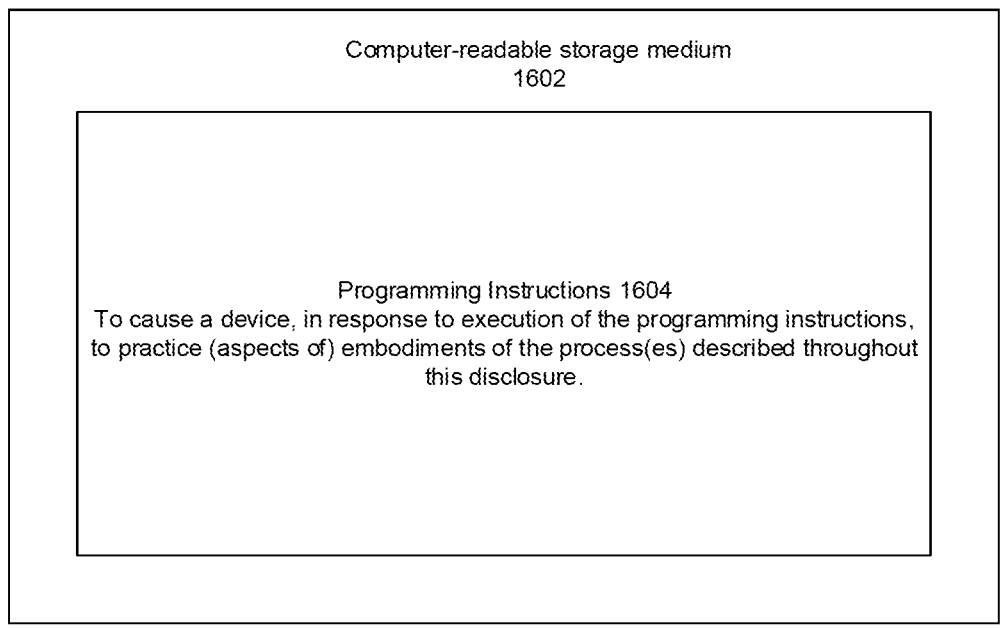
FIG. 13 is a block diagram of a computer-readable storage medium that can be used to implement some of the components of the UV of FIG. 1.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system." Furthermore, the present disclosure may take the form of a computer program product embodied in any tangible or non-transitory medium of expression having computer-usable program code embodied in the medium. FIG. 13 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 1602 may include a number of programming instructions 1604. Programming instructions 1604 may be configured to enable a device, e.g., computer 1500, in response to execution of the programming instructions, to implement (aspects of) control system 106, including launch initiator 102 and controller 104. In alternate embodiments, programming instructions 1604 may be disposed on multiple computer-readable non-transitory storage media 1602 instead. In still other embodiments, programming instructions 1604 may be disposed on computer-readable transitory storage media 1602, such as, signals.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the users computer, partly on the users computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flow chart illustrations and/or block diagrams of methods, apparatus (systems) and computer program products according to embodiments of the disclosure. It will be understood that each block of the flow chart illustrations and/or block diagrams, and combinations of blocks in the flow chart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow chart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow chart and/or block diagram block or blocks.

The computer program instructions may also be loaded onto a computer or other programmable data processing apparatus to cause a series of operational operations to be performed on the computer or other programmable apparatus to produce a computer implemented process such that the instructions which execute on the computer or other programmable apparatus provide processes for implementing the functions/acts specified in the flow chart and/or block diagram block or blocks.

EXAMPLES

The following examples pertain to further embodiments.

Example 1 is an unmanned vehicle for responding to a situation, comprising a launch initiator to launch the UV from a host vehicle on which the UV is attached, upon detection of a situation; and a controller to control the UV, after launch, to operate in an area or space to collect and send information about the situation.

Example 2 may include the subject matter of example 1, wherein the UV is an underwater or outer space vehicle, the controller is to control the UV to operate in underwater or outer space location, and the information collected and sent includes information about the host vehicle.

Example 3 may include the subject matter of example 1, wherein the host vehicle is in the situation, and the information collected and sent includes information about the host vehicle.

Example 4 may include the subject matter of any of examples 1-3, wherein the situation is an emergency situation, and the information collected and sent about the situation includes geographic coordinates of an area associated with the emergency situation.

Example 5 may include the subject matter of example 4, wherein the host vehicle is an aircraft and the information collected and sent about the situation further includes crash vector information.

Example 6 may include the subject matter of example 5, wherein the controller is to send, after launch, the information collected about the vehicle to a remote server, to an emergency responder, or by broadcasting the information on an air traffic control-monitored frequency in real time.

Example 7 may include the subject matter of example 6, wherein the launch initiator is to detect the emergency situation, and automatically cause the UV to launch upon detection.

Example 8 may include the subject matter of example 7, wherein the launch initiator is to detect the emergency situation by detecting at least one of a sudden drop in altitude or speed of the airplane, an impact of the airplane, or a fire on the airplane.

Example 9 may include the subject matter of any of examples 1-3, wherein the situation is an emergency situation.

Example 10 may include the subject matter of example 9, wherein the controller is to cause the UV to land or surface following sending the information.

Example 11 may include the subject matter of example 9, wherein the host vehicle is a computer assisted or autonomous driving (CA/AD) vehicle, and the launch initiator is to detect the emergency situation using input from a perception sensor on the CA/AD vehicle.

Example 12 may include the subject matter of example 9, wherein the controller is to further warn approaching vehicles of the emergency situation.

Example 13 may include the subject matter of example 9, wherein the controller is to further direct surrounding traffic to open and maintain an emergency lane for first responder vehicles responding to the emergency situation.

Example 14 may include the subject matter of example 9, wherein the information sent comprises pictures or video of the emergency situation, and the controller is to transmit the pictures or video to a first responder to the emergency situation.

Example 15 may include the subject matter of example 14, wherein the information further comprises at least one of a number of occupants of any vehicles involved in the emergency situation, a number of triggered airbags of any vehicles involved in the emergency situation, the impact speed of any vehicles involved in the emergency situation, or the acceleration of any vehicles involved in the emergency situation.

Example 16 may include the subject matter of example 15, wherein the host vehicle itself is an emergency response vehicle.

Example 17 may include the subject matter of example 15, wherein the host vehicle itself is involved in the emergency situation.

Example 18 may include the subject matter of any of examples 1-3, wherein the UV is to act as a decoupled sensor for the host vehicle.

Example 19 may include the subject matter of any of examples 1-3, further comprising an ejector to be mounted to the host vehicle, the ejector in communication with the launch initiator.

Example 20 may include the subject matter of any of examples 1-3, wherein the controller is to control the UV to provide two-way communications about the situation.

Example 21 may include the subject matter of example 20, further comprising one or more radios to provide the two-way communications by radio relay, or by aural relay.

Example 22 may include the subject matter of example 20, wherein the controller is to control the UV to act as a two-way communications relay for responders to the situation.

Example 23 may include the subject matter of any of examples 1-3, wherein the host vehicle is a transport vehicle involved in the situation.

Example 24 is an unmanned vehicle (UV) for responding to a situation, comprising launch means to cause the UV to be launched from a host vehicle in response to detecting a situation; and control means to control the UV, after launch, to operate in an area or space to collect and send information about the situation.

Example 25 may include the subject matter of example 24, wherein the UV is an underwater or outer space vehicle, the control means is to control the UV to operate in underwater or outer space location, and the information collected and sent includes information about the host vehicle.

Example 26 may include the subject matter of example 24, wherein the host vehicle is in the situation, and the information collected and sent includes information about the host vehicle.

Example 27 may include the subject matter of any of examples 24-26, wherein the situation is an emergency situation, and the information collected and sent about the situation includes geographic coordinates of an area associated with the emergency situation.

Example 28 may include the subject matter of example 27, wherein the host vehicle is an aircraft and the information collected and sent about the situation further includes crash vector information.

Example 29 may include the subject matter of example 28, wherein the control means is to send, after launch, the information collected about the vehicle to a remote server, to an emergency responder, or by broadcasting the information on an air traffic control-monitored frequency in real time.

Example 30 may include the subject matter of example 29, wherein the launch means is to detect the emergency situation, and automatically cause the UV to launch upon detection.

Example 31 may include the subject matter of example 30, wherein the launch means is to detect the emergency situation by detecting at least one of a sudden drop in altitude or speed of the airplane, an impact of the airplane, or a fire on the airplane.

Example 32 may include the subject matter of any of examples 24-26, wherein the situation is an emergency situation.

Example 33 may include the subject matter of example 32, wherein the control means is to cause the UV to land or surface following sending the information.

Example 34 may include the subject matter of example 32, wherein the host vehicle is a computer assisted or autonomous driving (CA/AD) vehicle, and the launch means is to detect the emergency situation using input from a perception sensor on the CA/AD vehicle.

Example 35 may include the subject matter of example 32, wherein the control means is to further warn approaching vehicles of the emergency situation.

Example 36 may include the subject matter of example 32, wherein the control means is to further direct surrounding traffic to open and maintain an emergency lane for first responder vehicles responding to the emergency situation.

Example 37 may include the subject matter of example 32, wherein the information sent comprises pictures or video of the emergency situation, and the control means is to transmit the pictures or video to a first responder to the emergency situation.

Example 38 may include the subject matter of example 37, wherein the information further comprises at least one of a number of occupants of any vehicles involved in the emergency situation, a number of triggered airbags of any vehicles involved in the emergency situation, the impact speed of any vehicles involved in the emergency situation, or the acceleration of any vehicles involved in the emergency situation.

Example 39 may include the subject matter of example 38, wherein the host vehicle itself is an emergency response vehicle.

Example 40 may include the subject matter of example 38, wherein the host vehicle itself is involved in the emergency situation.

Example 41 may include the subject matter of any of examples 24-26, wherein the UV is to act as a decoupled sensor for the host vehicle.

Example 42 may include the subject matter of any of examples 24-26, further comprising ejection means to be mounted to the host vehicle, the ejector in communication with the launch initiator.

Example 43 may include the subject matter of any of examples 24-26, wherein the control means is to control the UV to provide two-way communications about the situation.

Example 44 may include the subject matter of example 43, further comprising communication means to provide the two-way communications by radio relay, or by aural relay.

Example 45 may include the subject matter of example 43, wherein the control means is to control the UV to act as a two-way communications relay for responders to the situation.

Example 46 may include the subject matter of any of examples 24-26, wherein the host vehicle is a transport vehicle involved in the situation.

Example 47 is a method for deploying an unmanned vehicle (UV) from a host vehicle to a situation, comprising detecting the situation; launching the UV in response to detecting the situation; and controlling the UV to operate in an area or space to collect and send information about the situation.

Example 48 may include the subject matter of example 47, wherein the UV is an underwater or outer space vehicle, controlling the UV further comprises controlling the UV to operate in underwater or outer space location, and the information collected and sent includes information about the host vehicle.

Example 49 may include the subject matter of example 47, wherein the host vehicle is in the situation, and the information collected and sent includes information about the host vehicle.

Example 50 may include the subject matter of any of examples 47-49, wherein the situation is an emergency situation, and the information collected and sent about the situation includes geographic coordinates of an area associated with the emergency situation.

Example 51 may include the subject matter of example 50, wherein the host vehicle is an aircraft and the information collected and sent about the situation further includes crash vector information.

Example 52 may include the subject matter of example 51, further comprising sending, after launch, the information collected about the vehicle to a remote server, to an emergency responder, or by broadcasting the information on an air traffic control-monitored frequency in real time.

Example 53 may include the subject matter of example 52, further comprising detecting the emergency situation, and automatically causing the UV to launch upon detection.

Example 54 may include the subject matter of example 53, wherein detecting the emergency situation comprises detecting at least one of a sudden drop in altitude or speed of the airplane, an impact of the airplane, or a fire on the airplane.

Example 55 may include the subject matter of any of examples 47-49, wherein the situation is an emergency situation.

Example 56 may include the subject matter of example 55, further comprising causing the UV to land or surface following sending the information.

Example 57 may include the subject matter of example 55, wherein the host vehicle is a computer assisted or autonomous driving (CA/AD) vehicle, and detecting the emergency situation comprises using input from a perception sensor on the CA/AD vehicle.

Example 58 may include the subject matter of example 55, further comprising controlling the UV to warn approaching vehicles of the emergency situation.

Example 59 may include the subject matter of example 55, further comprising controlling the UV to direct surrounding traffic to open and maintain an emergency lane for first responder vehicles responding to the emergency situation.

Example 60 may include the subject matter of example 55, wherein the information sent comprises pictures or video of the emergency situation, and further comprising transmitting the pictures or video to a first responder to the emergency situation.

Example 61 may include the subject matter of example 60, wherein the information further comprises at least one of a number of occupants of any vehicles involved in the emergency situation, a number of triggered airbags of any vehicles involved in the emergency situation, the impact speed of any vehicles involved in the emergency situation, or the acceleration of any vehicles involved in the emergency situation.

Example 62 may include the subject matter of example 61, wherein the host vehicle itself is an emergency response vehicle.

Example 63 may include the subject matter of example 61, wherein the host vehicle itself is involved in the emergency situation.

Example 64 may include the subject matter of any of examples 47-49, wherein the UV is to act as a decoupled sensor for the host vehicle.

Example 65 may include the subject matter of any of examples 47-49, further comprising an ejector to be mounted to the host vehicle, and launching the UV is carried out in part by the ejector.

Example 66 may include the subject matter of any of examples 47-49, further comprising controlling the UV to provide two-way communications about the situation.

Example 67 may include the subject matter of example 66, wherein the two-way communications are provided by radio relay, or by aural relay.

Example 68 may include the subject matter of example 66, further comprising controlling the UV to act as a two-way communications relay for responders to the situation.

Example 69 may include the subject matter of any of examples 47-49, wherein the host vehicle is a transport vehicle involved in the situation.

Example 70 is a non-transitory computer-readable medium (CRM) comprising instructions that, when executed by an unmanned vehicle (UV) controller, are to cause a UV to be launched from a host vehicle upon detection of a situation; and control the UV to operate in an area or space to collect and send information about the situation.

Example 71 may include the subject matter of example 70, wherein the UV is an underwater or outer space vehicle, the instructions are further to control the UV to operate in underwater or outer space location, and the information collected and sent includes information about the host vehicle.

Example 72 may include the subject matter of example 70, wherein the host vehicle is in the situation, and the information collected and sent includes information about the host vehicle.

Example 73 may include the subject matter of any of examples 70-72, wherein the situation is an emergency situation, and the information collected and sent about the situation includes geographic coordinates of an area associated with the emergency situation.

Example 74 may include the subject matter of example 73, wherein the host vehicle is an aircraft and the information collected and sent about the situation further includes crash vector information.

Example 75 may include the subject matter of example 74, wherein the instructions are further to send, after launch, the information collected about the vehicle to a remote server, to an emergency responder, or by broadcasting the information on an air traffic control-monitored frequency in real time.

Example 76 may include the subject matter of example 75, wherein the instructions are further to detect the emergency situation, and automatically cause the UV to launch upon detection.

Example 77 may include the subject matter of example 76, wherein the instructions are further to detect the emergency situation by detecting at least one of a sudden drop in altitude or speed of the airplane, an impact of the airplane, or a fire on the airplane.

Example 78 may include the subject matter of any of examples 70-72, wherein the situation is an emergency situation.

Example 79 may include the subject matter of example 78, wherein the instructions are further to cause the UV to land or surface following sending the information.

Example 80 may include the subject matter of example 78, wherein the host vehicle is a computer assisted or autonomous driving (CA/AD) vehicle, and the instructions are further to detect the emergency situation using input from a perception sensor on the CA/AD vehicle.

Example 81 may include the subject matter of example 78, wherein the instructions are to cause the UV to further warn approaching vehicles of the emergency situation.

Example 82 may include the subject matter of example 78, wherein the instructions are to cause the UV to further direct surrounding traffic to open and maintain an emergency lane for first responder vehicles responding to the emergency situation.

Example 83 may include the subject matter of example 78, wherein the information sent comprises pictures or video of the emergency situation, and the instructions are further to cause the UV to transmit the pictures or video to a first responder to the emergency situation.

Example 84 may include the subject matter of example 83, wherein the information further comprises at least one of a number of occupants of any vehicles involved in the emergency situation, a number of triggered airbags of any vehicles involved in the emergency situation, the impact speed of any vehicles involved in the emergency situation, or the acceleration of any vehicles involved in the emergency situation.

Example 85 may include the subject matter of example 84, wherein the host vehicle itself is an emergency response vehicle.

Example 86 may include the subject matter of example 84, wherein the host vehicle itself is involved in the emergency situation.

Example 87 may include the subject matter of any of examples 70-72, wherein the UV is to act as a decoupled sensor for the host vehicle.

Example 88 may include the subject matter of any of examples 70-72, wherein the host vehicle further comprises an ejector to eject the UV.

Example 89 may include the subject matter of any of examples 70-72, wherein the instructions are to further control the UV to provide two-way communications about the situation.

Example 90 may include the subject matter of example 89, wherein the two-way communications are provided by radio relay, or by aural relay.

Example 91 may include the subject matter of example 89, wherein the instructions are to further control the UV to act as a two-way communications relay for responders to the situation.

Example 92 may include the subject matter of any of examples 70-72, wherein the host vehicle is a transport vehicle involved in the situation.

Example 93 is an unmanned vehicle (UV) for a collision involving a vehicle, comprising a launch initiator to trigger launching of the UV; and a controller to control the UV to capture an image of the collision from a perspective, wherein the UV is one of a plurality of UVs to capture images of the collision, and the perspective of the image captured by the UV is different from perspectives of images captured by each of the other drones in the plurality of drones.

Example 94 may include the subject matter of example 93, wherein the perspective of the captured image can be combined with the perspectives of the images captured by each of the other UVs in the plurality of UVs to create a three dimensional (3D) view of the collision.

Example 95 may include the subject matter of example 93 or 94, wherein each of the plurality of UVs is carried by a vehicle.

Example 96 may include the subject matter of example 95, wherein the vehicle is a computer assisted/autonomous driving (CA/AD) vehicle.

Example 97 may include the subject matter of example 95, wherein the vehicle further comprises a launch apparatus to launch the plurality of UVs upon receiving a launch signal.

Example 98 may include the subject matter of example 97, wherein the launch apparatus is to determine a force to launch each of the plurality of UVs based upon a speed and direction of travel of the vehicle.

Example 99 may include the subject matter of example 93 or 94, wherein the images captured by each of the plurality of UVs comprise video segments.

Example 100 may include the subject matter of example 93 or 94, wherein the controller controls the UV to land once the image has been captured.

Example 101 may include the subject matter of example 93 or 94, wherein the UV is to upload its captured image to a remote server.

Example 102 is an unmanned vehicle (UV) for capturing a vehicle collision, comprising launch means; and control means to control the UV to capture an image of the collision from a perspective; wherein the UV is one of a plurality of UVs, and is to capture one or more images of the vehicle from a first perspective, in coordination with another UV from the plurality of UVs capturing one or more images of the vehicle from a second perspective, so that at least the first and second perspectives can be combined to form a complete view of the vehicle.

Example 103 may include the subject matter of example 102, wherein the perspective of the captured image can be combined with the perspectives of the images captured by each of the other UVs in the plurality of UVs to create a three dimensional (3D) view of the collision.

Example 104 may include the subject matter of example 102 or 103, wherein each of the plurality of UVs is carried by the vehicle involved in the collision.

Example 105 may include the subject matter of example 104, wherein the vehicle is a computer assisted/autonomous driving (CA/AD) vehicle.

Example 106 may include the subject matter of example 104, wherein the vehicle further comprises a launch apparatus to launch the plurality of UVs upon receiving a launch signal.

Example 107 may include the subject matter of example 106, wherein the launch apparatus is to determine a force to launch each of the plurality of UVs based upon a speed and direction of travel of the vehicle.

Example 108 may include the subject matter of example 102 or 103, wherein the images captured by each of the plurality of UVs comprise video segments.

Example 109 may include the subject matter of example 102 or 103, wherein the control means is to control the UV to land once the image has been captured.

Example 110 may include the subject matter of example 102 or 103, wherein the UV is to upload its captured image to a remote server.

Example 111 is a method for capturing a vehicle collision, comprising detecting an imminent collision; signaling a launch initiator to launch an unmanned vehicle (UV), the UV being one of a plurality of UVs; and controlling the UV to capture an image of the vehicle collision from a perspective, the perspective being different from the perspectives of images captured by each of the other UVs in the plurality of UVs.

Example 112 may include the subject matter of example 111, further comprising combining the perspective of the captured image with the perspectives of the images captured by each of the other UVs in the plurality of UVs to create a three dimensional (3D) view of the collision.

Example 113 may include the subject matter of example 111 or 112, wherein each of the plurality of UVs is carried by a vehicle involved in the collision.

Example 114 may include the subject matter of example 113, wherein the vehicle is a computer assisted/autonomous driving (CA/AD) vehicle.

Example 115 may include the subject matter of example 113, wherein the vehicle further comprises a launch apparatus to launch the plurality of UVs upon receiving a launch signal.

Example 116 may include the subject matter of example 115, further comprising determining a force to launch each of the plurality of UVs based upon a speed and direction of travel of the vehicle.

Example 117 may include the subject matter of example 111 or 112, wherein the images captured by each of the plurality of UVs comprise video segments.

Example 118 may include the subject matter of example 111 or 112, further comprising controlling the UV to land once the image has been captured.

Example 119 may include the subject matter of example 111 or 112, further comprising uploading, by the UV, of the captured image to a remote server.

Example 120 is a non-transitory computer-readable medium (CRM) comprising instructions that, when executed by an unmanned vehicle (UV) controller, are to detect an imminent collision; signal a launch initiator to launch a UV, the UV being one of a plurality of UVs; and control the UV to capture an image of the vehicle collision from a perspective, the perspective being different from the perspectives of images captured by each of the other UVs in the plurality of UVs.

Example 121 may include the subject matter of example 120, wherein the perspective of the captured image can be combined with the perspectives of the images captured by each of the other UVs in the plurality of UVs to create a three dimensional (3D) view of the collision.

Example 122 may include the subject matter of example 120 or 121, wherein each of the plurality of UVs is carried by a vehicle involved in the collision.

Example 123 may include the subject matter of example 122, wherein the vehicle is a computer assisted/autonomous driving (CA/AD) vehicle.

Example 124 may include the subject matter of example 122, wherein the vehicle further comprises a launch apparatus to launch the plurality of UVs upon receiving a launch signal.

Example 125 may include the subject matter of example 124, wherein the launch apparatus is to determine a force to launch each of the plurality of UVs based upon a speed and direction of travel of the vehicle.

Example 126 may include the subject matter of example 120 or 121, wherein the images captured by each of the plurality of UVs comprise video segments.

Example 127 may include the subject matter of example 120 or 121, wherein the instructions are to further control the UV to land once the image has been captured.

Example 128 may include the subject matter of example 120 or 121, wherein the instructions are to further cause the UV to upload the captured image to a remote server.

Example 129 is an unmanned vehicle (UV) for alerting drivers on a highway approaching a situation, comprising a launch initiator to launch the UV; and a controller to control the UV to provide either an aural alert, a visual alert, or both; wherein upon detection of the situation the launch initiator is to launch the UV and the controller is to control the UV to provide an alert to drivers approaching the situation.

Example 130 may include the subject matter of example 129, wherein the UV is one of a plurality of UVs, each of the plurality of UVs being disposed along the side of a highway and spaced apart from the other UVs of the plurality of UVs.

Example 131 may include the subject matter of example 130, wherein the UV is a first UV, and the first UV is to signal a second UV of the plurality of UVs to replace the first UV when the first UV detects that the first UV's battery charge is below a predetermined threshold.

Example 132 may include the subject matter of example 131, wherein the first UV is to further cause the first UV to return to a base station to recharge the first UV's battery.

Example 133 may include the subject matter of any of examples 129-132, wherein the controller is to control the UV to provide an alert to drivers at a predetermined distance from the situation.

Example 134 may include the subject matter of example 133, wherein the predetermined distance is to vary based upon a detected end to traffic approaching the situation.

Example 135 may include the subject matter of example 129, wherein the UV is one of a plurality of UVs, each UV of the plurality of UVs is to be disposed along the side of a highway at a docking station, where the docking station can accommodate a plurality of UVs.

Example 136 may include the subject matter of any of examples 129-132, wherein the controller is to control the UV to detect visual cues in the situation indicating the presence of potentially dangerous materials.

Example 137 may include the subject matter of example 136, wherein the alert provided to drivers approaching the situation is varied depending based on the presence potentially dangerous materials.

Example 138 is an unmanned vehicle (UV) for alerting drivers on a highway approaching a situation, comprising launch means to initiate a launch of the UV; and control means to control the UV to provide either an aural alert, a visual alert, or both; wherein upon detection of a situation the launch initiator is to launch the UV and the controller is to control the UV to provide an alert to drivers approaching the emergency situation.

Example 139 may include the subject matter of example 138, wherein the UV is one of a plurality of UVs, each of the plurality of UVs being disposed along the side of a highway and spaced apart from the other UVs of the plurality of UVs.

Example 140. may include the subject matter of example 139, wherein the UV is a first UV, and the first UV is to signal a second UV of the plurality of UVs to replace the first UV when the first UV detects that the first UV's battery charge is below a predetermined threshold.

Example 141 may include the subject matter of example 140, wherein the first UV is to further cause the first UV to return to a base station to recharge the first UV's battery.

Example 142 may include the subject matter of any of examples 138-141, wherein the control means is to control the UV to provide an alert to drivers at a predetermined distance from the situation.

Example 143 may include the subject matter of example 142, wherein the predetermined distance is to vary based upon a detected end to traffic approaching the situation.

Example 144 may include the subject matter of example 138, wherein the UV is one of a plurality of UVs, each UV of the plurality of UVs is to be disposed along the side of a highway at a docking means for receiving and charging a UV, and the docking means can accommodate a plurality of UVs.

Example 145 may include the subject matter of any of examples 138-141, wherein the control means is to control the UV to detect visual cues in the situation indicating the presence of potentially dangerous materials.

Example 146 may include the subject matter of example 145, wherein the alert provided to drivers approaching the situation is varied depending based on the presence potentially dangerous materials.

Example 147 is a method for alerting drivers on a highway approaching a situation comprising detecting the situation; initiating the launch of an unmanned vehicle (UV); and displaying, by the UV, either an aural alert, a visual alert, or both to drivers approaching the situation.

Example 148 may include the subject matter of example 147, wherein the UV is one of a plurality of UVs, each of the plurality of UVs being disposed along the side of a highway and spaced apart from the other UVs of the plurality of UVs.

Example 149 may include the subject matter of example 148, wherein the UV is a first UV, and the method further comprises signaling, by the first UV, a second UV of the plurality of UVs to replace the first UV when the first UV detects that the first UV's battery charge is below a predetermined threshold.

Example 150 may include the subject matter of example 149, further comprising causing the first UV to return to a base station to recharge the first UV's battery.

Example 151 may include the subject matter of any of examples 147-150, further comprising controlling the UV to provide an alert to drivers at a predetermined distance from the situation.

Example 152 may include the subject matter of example 151, wherein the predetermined distance is to vary based upon a detected end to traffic approaching the situation.

Example 153 may include the subject matter of example 147, wherein the UV is one of a plurality of UVs, and further comprising disposing each UV of the plurality of UVs along the side of a highway at a docking station, where the docking station can accommodate a plurality of UVs.

Example 154 may include the subject matter of any of examples 147-150, further comprising controlling the UV to detect visual cues in the situation indicating the presence of potentially dangerous materials.

Example 155 may include the subject matter of example 154, wherein the alert provided to drivers approaching the situation is varied depending based on the presence potentially dangerous materials.

Example 156 is a non-transitory computer-readable medium (CRM) comprising instructions that, when executed by an unmanned vehicle (UV) controller, are to detect a situation; initiate the launch of an UV; and cause the UV to provide either an aural alert, a visual alert, or both to drivers approaching the situation.

Example 157 may include the subject matter of example 156, wherein the UV is one of a plurality of UVs, each of the plurality of UVs being disposed along the side of a highway and spaced apart from the other UVs of the plurality of UVs.

Example 158 may include the subject matter of example 157, wherein the UV is a first UV, and the instructions are to further cause the first UV to signal a second UV of the plurality of UVs to replace the first UV when the first UV detects that the first UV's battery charge is below a predetermined threshold.

Example 159 may include the subject matter of example 158, wherein the instructions are to further cause the first UV to return to a base station to recharge the first UV's battery.

Example 160 may include the subject matter of any of examples 156-159, wherein the instructions are to further cause the UV to provide an alert to drivers at a predetermined distance from the situation.

Example 161 may include the subject matter of example 160, wherein the predetermined distance is to vary based upon a detected end to traffic approaching the situation.

Example 162 may include the subject matter of example 156, wherein the UV is one of a plurality of UVs, each UV of the plurality of UVs is to be disposed along the side of a highway at a docking station, where the docking station can accommodate a plurality of UVs.

Example 163 may include the subject matter of any of examples 156-159, wherein the instructions are to further control the UV to detect visual cues in the situation indicating the presence of potentially dangerous materials.

Example 164 may include the subject matter of example 163, wherein the alert provided to drivers approaching the situation is varied depending based on the presence potentially dangerous materials.

What is claimed is:

1. An unmanned vehicle (UV) carried by a vehicle, the UV comprising:
    a launch initiator to trigger launching of the UV in response to receipt of a launch signal, wherein the launch signal is based on a collision of the vehicle and the launch signal is responsive to at least one of an external signal from the vehicle indicating the collision of the vehicle has occurred or is imminent or a sensor incorporated into the UV indicating the collision of the vehicle has occurred or is imminent; and
    a controller to control the UV to travel in a predetermined direction from a point of the collision of the vehicle to capture an image of the collision from a perspective.

2. The UV of claim 1, wherein the UV is one of a plurality of UVs carried by the vehicle and the predetermined direction is different than respective travel directions of other UVs of the plurality of UVs such that each UV of the plurality of UVs travels in different directions from the point of the collision to capture respective images of the collision from different perspectives.

3. The UV of claim 2, wherein the vehicle is a computer assisted/autonomous driving (CA/AD) vehicle.

4. The UV of claim 1, wherein the vehicle further comprises a launch apparatus to launch the UV upon receipt of the launch signal.

5. The UV of claim 4, wherein the launch apparatus is to launch different UVs of a plurality of UVs with different forces.

6. A method for capturing a collision of a vehicle, comprising:
    detecting an impact from the collision of the vehicle;
    signaling a launch initiator to launch an unmanned vehicle (UV) from the vehicle in response to the detecting of the impact; and
    controlling the UV to capture an image of the collision of the vehicle from a predetermined distance from the collision and with a perspective.

7. The method of claim 6, further comprising:
    in response to the detecting, signaling the launch initiator to launch a plurality of UVs from the vehicle in different directions, wherein the plurality of UVs are to capture images of the collision of the vehicle from different perspectives from one another.

8. The method of claim 7, further comprising determining different forces with which to launch different UVs of the plurality of UVs.

9. A non-transitory computer-readable medium (CRM) comprising instructions that, when executed by an unmanned vehicle (UV) controller, are to:
    detect a collision or imminent collision of a vehicle;
    in response to the detection, signal a launch initiator to launch a plurality of UVs in different directions from the vehicle; and
    control the plurality of UVs to capture respective images of a collision point of the vehicle such that the respective images captured by each UV in the plurality of UVs is from a different perspective than perspectives of other images captured by other UVs of the plurality of UVs.

10. The CRM of claim 9, wherein the images captured by the plurality of UVs can be combined to create a three dimensional (3D) view of the collision.

11. The CRM of claim 9, further comprising instructions that, when executed by the UV controller, are to launch the UV a predetermined distance from the collision point.

12. The CRM of claim 11, wherein the vehicle is a computer assisted/autonomous driving (CA/AD) vehicle.

13. The CRM of claim 9, further comprising instructions that, when executed by the UV controller, are to determine a force with which to launch individual UVs of the plurality of UVs based on a direction in which each UV is launched relative to a direction of travel of the vehicle.

14. The UV of claim 1, wherein the external signal is one or both of from a component disposed in the vehicle and originates from a source external to the vehicle.

15. The UV of claim 1, wherein the launch signal is the external signal or a signal from the sensor.

16. The UV of claim 1, wherein the launch signal or the external signal is conveyed through a wired transmission medium or a wireless transmission medium.

17. The UV of claim 1, wherein the launch initiator is responsive to the sensor incorporated into the UV indicating the collision of the vehicle has occurred when the collision prevents the external signal from triggering deployment of the UV.

18. The UV of claim 2, wherein the respective images from the different perspectives can be combined to create a three dimensional (3D) view of the collision.

19. The UV of claim 2, wherein each of the UVs is to travel a predetermined distance in the different directions from the point of the collision to capture the respective images of the collision from the different perspectives.

20. The UV of claim 5, wherein:
the different UVs include a UV which is to be launched in a direction of travel of the vehicle and a UV which is to be launched in a direction opposite to the direction of travel; and
a launch force of the UV which is to be launched in the direction of travel is less than a launch force of the UV which is to be launched in the direction opposite to the direction of travel.

21. The method of claim 6, wherein the signaling of the launch initiator comprises receiving other signals from at least one of an external source, a sensor incorporated into the UV, or a sensor incorporated into the vehicle.

22. An unmanned vehicle (UV), comprising:
sensor circuitry to capture first sensor data representative of a collision of a vehicle on which the UV is carried;
interface circuitry to obtain second sensor data from a sensor disposed in or on the vehicle; and
processor circuitry connected to the sensor circuitry and the interface circuitry, wherein the processor circuitry is to:
identify the collision of the vehicle based on the first sensor data or the second sensor data, and
trigger launching of the UV from the vehicle in response to the identification of the collision.

23. The UV of claim 22, wherein the processor circuitry is to trigger the launching of the UV when the first sensor data indicates the collision of the vehicle has occurred and when the collision prevents an external trigger signal based on the second sensor data to be used to trigger deployment of the UV.

24. The UV of claim 22, wherein the processor circuitry is to trigger the launching of the UV when the sensor disposed in or on the vehicle predicts an impending crash based on an obstacle on a collision trajectory with the vehicle.

* * * * *